United States Patent
Bao et al.

(10) Patent No.: US 12,219,519 B2
(45) Date of Patent: Feb. 4, 2025

(54) POSITIONING SIGNAL MEASUREMENT WITH DISCONTINUOUS RECEPTION AND WAKE-UP SIGNAL

(71) Applicant: QUALCOMM Incorporated, San Diego, CA (US)

(72) Inventors: Jingchao Bao, San Diego, CA (US); Sony Akkarakaran, Poway, CA (US); Alexandros Manolakos, Escondido, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/482,289

(22) Filed: Oct. 6, 2023

(65) Prior Publication Data
US 2024/0040536 A1    Feb. 1, 2024

Related U.S. Application Data

(63) Continuation of application No. 17/355,896, filed on Jun. 23, 2021, now Pat. No. 11,825,438.

(60) Provisional application No. 63/044,811, filed on Jun. 26, 2020.

(51) Int. Cl.
| | |
|---|---|
| *H04W 64/00* | (2009.01) |
| *H04W 52/02* | (2009.01) |
| *H04W 76/28* | (2018.01) |

(52) U.S. Cl.
CPC ....... *H04W 64/00* (2013.01); *H04W 52/0229* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2018/0343132 A1* | 11/2018 | Maheshwari | H04W 24/10 |
| 2019/0182794 A1 | 6/2019 | Wong et al. | |
| 2021/0314866 A1* | 10/2021 | Lee | H04W 52/0229 |
| 2021/0410098 A1 | 12/2021 | Bao et al. | |

FOREIGN PATENT DOCUMENTS

| | | |
|---|---|---|
| WO | 2018136224 A2 | 7/2018 |
| WO | 2020008635 A1 | 1/2020 |
| WO | 2020037319 A1 | 2/2020 |
| WO | 2020093358 A1 | 5/2020 |

OTHER PUBLICATIONS

International Preliminary Report on Patentability—PCT/US2021/038916, The International Bureau of WIPO—Geneva, Switzerland, Jan. 5, 2023.
International Search Report and Written Opinion—PCT/US2021/038916—ISA/EPO—Oct. 28, 2021.

* cited by examiner

*Primary Examiner* — Suhail Khan
(74) *Attorney, Agent, or Firm* — Sunstein LLP

(57) ABSTRACT

A method of configuring a user equipment (UE) includes transmitting configuration information to the UE, the configuration information configured to cause the UE to determine whether to measure a portion of a positioning signal based on timing of the portion of the positioning signal relative to at least one of an ON time of a discontinuous reception mode of the UE or an OFF time of the discontinuous reception mode.

28 Claims, 18 Drawing Sheets

| PRS config \ Report config | Periodic positioning report | Semipersistent positioning report | Asynchronous postioning report |
|---|---|---|---|
| Periodic DL-PRS | No dynamic trigger/activation. Report could be on PUCCH (L1) and/or PUSCH (L1/L2) | DCI triggered: report on PUSCH (L1/L2). MAC-CE activation: report on PUCCH (L1) and/or PUSCH (L1/L2) | DCI triggered: report on PUSCH (L1/L2) |
| SP DL-PRS | NA | DCI triggered: report on PUSCH (L1/L2). MAC-CE activation: report on PUCCH (L1) and/or PUSCH (L1/L2) | DCI triggered: report on PUSCH (L1/L2) |
| A DL-PRS | NA | NA | DCI triggered: report on PUSCH (L1/L2) |

FIG. 10

| Timing of Positioning Report | L1/L2 Positioning Report |
|---|---|
| Within DRX ON time | A/SP/P report is expected as scheduled<br><br>With PUCCH mask set, no PUCCH report<br>With PUSCH mask set, no PUSCH report |
| Partial overlap with DRX ON time | NA |
| Outside of DRX ON time | Asynchronous report is expected as scheduled<br><br>For P/SP report, the report behavior is controlled by commands:<br>   With PUCCH off command set, no PUCCH report<br>   With PUSCH off command set, no PUSCH report |

FIG. 11

POSITIONING SIGNAL MEASUREMENT WITH DISCONTINUOUS RECEPTION AND WAKE-UP SIGNAL

CROSS-REFERENCE TO RELATED APPLICATIONS

This application is a continuation of U.S. application Ser. No. 17/355,896, filed Jun. 23, 2021, entitled "POSITIONING SIGNAL MEASUREMENT WITH DISCONTINUOUS RECEPTION AND WAKE-UP SIGNAL," which claims the benefit of U.S. Provisional Application No. 63/044,811, filed Jun. 26, 2020, entitled "POSITIONING SIGNAL MEASUREMENT WITH DISCONTINUOUS RECEPTION AND WAKE-UP SIGNAL," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example user equipment (UE) includes: a transceiver; a memory; and a processor communicatively coupled to the transceiver and the memory, where the processor is configured to: operate in a discontinuous reception mode including time interleaved ON times of the discontinuous reception mode and OFF times of the discontinuous reception mode; and determine whether to measure a portion of a positioning signal based on timing of the portion of the positioning signal relative to at least one of a first one of the ON times of the discontinuous reception mode or a first one of the OFF times of the discontinuous reception mode.

Implementations of such a UE may include one or more of the following features. The processor is configured to at least one of: measure all of the portion of the positioning signal in response to a first part of the portion of the positioning signal being scheduled to arrive during the first one of the ON times and a second part of the portion of the positioning signal being scheduled to arrive during the first one of the OFF times; or measure a third part of the portion of the positioning signal in response to the first part of the portion of the positioning signal being scheduled to arrive during the first one of the ON times and the second part of the portion of the positioning signal being scheduled to arrive during the first one of the OFF times, the third part of the positioning signal being less than the portion of the positioning signal; or inhibit measuring any of the portion of the positioning signal in response to the first part of the portion of the positioning signal being scheduled to arrive during the first one of the ON times and the second part of the portion of the positioning signal being scheduled to arrive during the first one of the OFF times. The processor is configured to receive configuration information via the transceiver and to determine, based on the configuration information, whether to measure all of the portion of the positioning signal, or measure the third part of the portion of the positioning signal, or inhibit measuring any of the portion of the positioning signal, in response to the first part of the portion of the positioning signal being scheduled to arrive during the first one of the ON times and the second part of the portion of the positioning signal being scheduled to arrive during the first one of the OFF times.

Also or alternatively, implementations of such a UE may include one or more of the following features. The processor is configured to: measure a third part of the portion of the positioning signal in response to a first part of the portion of the positioning signal being scheduled to arrive during the first one of the ON times and a second part of the portion of the positioning signal being scheduled to arrive during the first one of the OFF times, the third part of the positioning signal being less than the portion of the positioning signal; and determine the third part of the portion of the positioning signal at least one of: based on at least one of a resource set, a frequency layer, a number of sources of the portion of the positioning signal, or a repetition factor of the positioning signal; or as the first part of the portion of the positioning signal. The processor is configured to measure all of the portion of the positioning signal in response to all of the positioning signal being scheduled to arrive in the first one of the ON times of the discontinuous reception mode. The processor is configured to at least one of: measure all of the portion of the positioning signal in response to all of the positioning signal being scheduled to arrive in the first one of the OFF times of the discontinuous reception mode; or inhibit measuring any of the portion of the positioning signal in response to all of the positioning signal being scheduled to arrive in the first one of the OFF times of the discontinuous reception mode. The processor is configured to be dynamically configured by configuration information received via the transceiver to either measure all of the portion of the positioning signal, or inhibit measuring any of the portion of the positioning signal, in response to all of the positioning signal being scheduled to arrive in the first one of the OFF times of the discontinuous reception mode. The processor is configured to transmit a scheduling request to a network entity via the transceiver for an uplink grant to transmit a positioning report above layer 1 and layer 2. The processor is configured to: transmit a positioning report at least one of asynchronously, semi-persistently, or periodically; and at least one of: inhibit transmitting of the positioning report during a second one of the ON times of the discontinuous reception mode based on an uplink report flag being received from a network entity; or inhibit transmitting of the positioning report based on the uplink report flag being received from the network entity, and the positioning report being semi-persistent or periodic and being scheduled to be sent during a second one of the OFF times of the discontinuous reception mode.

Another example UE includes: means for operating in a discontinuous reception mode including time interleaved ON times of the discontinuous reception mode and OFF times of the discontinuous reception mode; and means for determining whether to measure a portion of a positioning signal based on timing of the portion of the positioning signal relative to at least one of a first one of the ON times of the discontinuous reception mode or a first one of the OFF times of the discontinuous reception mode.

Implementations of such a UE may include one or more of the following features. The UE includes at least one of: first measuring means, for measuring all of the portion of the positioning signal in response to a first part of the portion of the positioning signal being scheduled to arrive during the first one of the ON times and a second part of the portion of the positioning signal being scheduled to arrive during the first one of the OFF times; or second measuring means, for measuring a third part of the portion of the positioning signal in response to the first part of the portion of the positioning signal being scheduled to arrive during the first one of the ON times and the second part of the portion of the positioning signal being scheduled to arrive during the first one of the OFF times, the third part of the positioning signal being less than the portion of the positioning signal; or means for inhibiting measuring any of the portion of the positioning signal in response to the first part of the portion of the positioning signal being scheduled to arrive during the first one of the ON times and the second part of the portion of the positioning signal being scheduled to arrive during the first one of the OFF times. The UE includes: means for receiving configuration information; and means for determining, based on the configuration information, whether to measure all of the portion of the positioning signal, or measure the third part of the portion of the positioning signal, or inhibit measuring any of the portion of the positioning signal, in response to the first part of the portion of the positioning signal being scheduled to arrive during the first one of the ON times and the second part of the portion of the positioning signal being scheduled to arrive during the first one of the OFF times.

Also or alternatively, implementations of such a UE may include one or more of the following features. The UE includes: means for measuring a third part of the portion of the positioning signal in response to a first part of the portion of the positioning signal being scheduled to arrive during the first one of the ON times and a second part of the portion of the positioning signal being scheduled to arrive during the first one of the OFF times, the third part of the positioning signal being less than the portion of the positioning signal; and means for determining the third part of the portion of the positioning signal at least one of: based on at least one of a resource set, a frequency layer, a number of sources of the portion of the positioning signal, or a repetition factor of the positioning signal; or as the first part of the portion of the positioning signal. The UE includes means for measuring all of the portion of the positioning signal in response to all of the positioning signal being scheduled to arrive in the first one of the ON times of the discontinuous reception mode.

The UE includes at least one of: means for measuring all of the portion of the positioning signal in response to all of the positioning signal being scheduled to arrive in the first one of the OFF times of the discontinuous reception mode; or means for inhibiting measuring any of the portion of the positioning signal in response to all of the positioning signal being scheduled to arrive in the first one of the OFF times of the discontinuous reception mode. The UE includes: means for receiving configuration information; and means for responding to the configuration information to either measure all of the portion of the positioning signal, or inhibit measuring any of the portion of the positioning signal, in response to all of the positioning signal being scheduled to arrive in the first one of the OFF times of the discontinuous reception mode. The UE includes means for transmitting a scheduling request to a network entity for an uplink grant to transmit a positioning report above layer 1 and layer 2. The UE includes: means for transmitting a positioning report at least one of asynchronously, semi-persistently, or periodically; and at least one of: means for inhibiting transmitting of the positioning report during a second one of the ON times of the discontinuous reception mode based on an uplink report flag being received from a network entity; or means for inhibiting transmitting of the positioning report based on the uplink report flag being received from the network entity, and the positioning report being semi-persistent or periodic and being scheduled to be sent during a second one of the OFF times of the discontinuous reception mode.

An example method of performing positioning operations at a user equipment includes: operating the user equipment in a discontinuous reception mode including time interleaved ON times of the discontinuous reception mode and OFF times of the discontinuous reception mode; and determining, at the user equipment, whether to measure a portion of a positioning signal based on timing of the portion of the positioning signal relative to at least one of a first one of the ON times of the discontinuous reception mode or a first one of the OFF times of the discontinuous reception mode.

Implementations of such a method may include one or more of the following features. The method includes at least one of: measuring all of the portion of the positioning signal in response to a first part of the portion of the positioning signal being scheduled to arrive during the first one of the ON times and a second part of the portion of the positioning signal being scheduled to arrive during the first one of the OFF times; or measuring a third part of the portion of the positioning signal in response to the first part of the portion of the positioning signal being scheduled to arrive during the first one of the ON times and the second part of the portion of the positioning signal being scheduled to arrive during the first one of the OFF times, the third part of the positioning signal being less than the portion of the positioning signal; or inhibiting measuring any of the portion of the positioning signal in response to the first part of the portion of the positioning signal being scheduled to arrive during the first one of the ON times and the second part of the portion of the positioning signal being scheduled to arrive during the first one of the OFF times. The method includes: receiving configuration information at the user equipment; and determining, based on the configuration information, whether to measure all of the portion of the positioning signal, or measure the third part of the portion of the positioning signal, or inhibit measuring any of the portion of the positioning signal, in response to the first part of the portion of the positioning signal being scheduled to arrive during the first one of the ON times and the second part of the portion of the positioning signal being scheduled to arrive during the first one of the OFF times.

Also or alternatively, implementations of such a method may include one or more of the following features. The method includes: measuring a third part of the portion of the positioning signal in response to a first part of the portion of the positioning signal being scheduled to arrive during the first one of the ON times and a second part of the portion of the positioning signal being scheduled to arrive during the first one of the OFF times, the third part of the positioning signal being less than the portion of the positioning signal; and determining the third part of the portion of the positioning signal at least one of: based on at least one of a resource set, a frequency layer, a number of sources of the portion of the positioning signal, or a repetition factor of the positioning signal; or as the first part of the portion of the positioning signal. The method includes measuring all of the portion of the positioning signal in response to all of the positioning signal being scheduled to arrive in the first one of the ON times of the discontinuous reception mode. The method includes at least one of: measuring all of the portion of the positioning signal in response to all of the positioning signal being scheduled to arrive in the first one of the OFF times of the discontinuous reception mode; or inhibiting measuring any of the portion of the positioning signal in response to all of the positioning signal being scheduled to arrive in the first one of the OFF times of the discontinuous reception mode. The method includes: receiving configuration information at the user equipment; and responding to the configuration information by either measuring all of the portion of the positioning signal, or inhibiting measuring any of the portion of the positioning signal, in response to all of the positioning signal being scheduled to arrive in the first one of the OFF times of the discontinuous reception mode. The method includes transmitting a scheduling request to a network entity for an uplink grant to transmit a positioning report above layer 1 and layer 2. The method includes: transmitting a positioning report at least one of asynchronously, semi-persistently, or periodically; and at least one of: inhibiting transmitting of the positioning report during a second one of the ON times of the discontinuous reception mode based on an uplink report flag being received from a network entity; or inhibiting transmitting of the positioning report based on the uplink report flag being received from the network entity, and the positioning report being semi-persistent or periodic and being scheduled to be sent during a second one of the OFF times of the discontinuous reception mode.

An example non-transitory, processor-readable storage medium includes processor-readable instructions configured to cause a processor of a user equipment to: operate the user equipment in a discontinuous reception mode including time interleaved ON times of the discontinuous reception mode and OFF times of the discontinuous reception mode; and determine whether to measure a portion of a positioning signal based on timing of the portion of the positioning signal relative to at least one of a first one of the ON times of the discontinuous reception mode or a first one of the OFF times of the discontinuous reception mode.

An example network entity includes: a transceiver; a memory; and a processor communicatively coupled to the transceiver and the memory, where the processor is configured to send configuration information to a UE via the transceiver, the configuration information configured to cause the UE to determine whether to measure a portion of a positioning signal based on timing of the portion of the positioning signal relative to at least one of an ON time of a discontinuous reception mode of the UE or an OFF time of the discontinuous reception mode.

Another example network entity includes: a transceiver; and means for sending configuration information to a UE via the transceiver, the configuration information configured to cause the UE to determine whether to measure a portion of a positioning signal based on timing of the portion of the positioning signal relative to at least one of an ON time of a discontinuous reception mode of the UE or an OFF time of the discontinuous reception mode.

An example method of facilitating position estimation of a UE includes: sending configuration information to the UE, the configuration information configured to cause the UE to determine whether to measure a portion of a positioning signal based on timing of the portion of the positioning signal relative to at least one of an ON time of a discontinuous reception mode of the UE or an OFF time of the discontinuous reception mode.

Another example non-transitory, processor-readable storage medium includes processor-readable instructions configured to cause a processor, in order to facilitate position determination of a UE, to: send configuration information to the UE, the configuration information configured to cause the UE to determine whether to measure a portion of a positioning signal based on timing of the portion of the positioning signal relative to at least one of an ON time of a discontinuous reception mode of the UE or an OFF time of the discontinuous reception mode.

Another example UE includes: a receiver; a memory; and a processor communicatively coupled to the receiver and the memory, where the processor is configured to: operate in a discontinuous reception mode including time interleaved ON times of the discontinuous reception mode, in which the processor is in an active mode in which the processor monitors for a positioning signal measurement trigger signal, and OFF times of the discontinuous reception mode, in which the processor is in an inactive mode; receive a wake-up signal via the receiver; and determine whether to measure a positioning signal based on whether the wake-up signal indicates to implement the active mode during a scheduled discontinuous reception mode ON time or to skip the scheduled discontinuous reception mode ON time.

Implementations of such a UE may include one or more of the following features. The processor is configured to measure the positioning signal, in response to the wake-up signal indicating to skip the scheduled discontinuous reception mode ON time, without monitoring for the positioning signal measurement trigger signal. The processor is configured to respond to the wake-up signal indicating to skip the scheduled discontinuous reception mode ON time by monitoring for the positioning signal measurement trigger signal. The processor is configured to respond to the wake-up signal indicating to skip the scheduled discontinuous reception mode ON time by monitoring for the positioning signal measurement trigger signal for a monitor duration that is less than the discontinuous reception mode ON time. The processor is configured to respond to the wake-up signal indicating to skip the scheduled discontinuous reception mode ON time by monitoring a control channel for the positioning signal measurement trigger signal over a limited frequency range that is less than a bandwidth of the control channel. The processor is configured to respond to the wake-up signal indicating to skip the scheduled discontinuous reception mode ON time, and receipt of an instruction from a network entity via the receiver to monitor for the positioning signal measurement trigger signal, by monitoring for the positioning signal measurement trigger signal. The instruction is included in the wake-up signal. The instruction is included in a Radio Resource Control message.

Also or alternatively, implementations of such a UE may include one or more of the following features. The processor is configured to: measure the positioning signal in response to the wake-up signal indicating to skip the scheduled discontinuous reception mode ON time; and transmit an aperiodic positioning information report in response to measurement of the positioning signal, and the positioning signal is an aperiodic positioning signal. The UE includes a transmitter communicatively coupled to the processor, and the processor is configured to: measure the positioning signal in response to the wake-up signal indicating to skip the scheduled discontinuous reception mode ON time; transmit, via the transmitter, a positioning report of positioning information based on measuring the positioning signal; and inhibit transmitting the positioning report in response to receiving a report-inhibiting instruction from a network entity via the receiver. The processor is configured to: measure the positioning signal in response to the wake-up signal indicating to skip the scheduled discontinuous reception mode ON time; and transmit a positioning report of positioning information based on measuring the positioning signal and in response to at least one of measuring a threshold number of positioning reference signal resources or receiving a report request from a network entity. The processor is configured to inhibit measurement of the positioning signal in response to the wake-up signal indicating to skip the scheduled discontinuous reception mode ON time. The processor is configured to measure the positioning signal in response to the wake-up signal indicating to implement the active mode during the scheduled discontinuous reception mode ON time.

Another example UE includes: means for operating in a discontinuous reception mode including time interleaved ON times of the discontinuous reception mode, in which the means for operating are in an active mode in which the means for operating monitor for a positioning signal measurement trigger signal, and OFF times of the discontinuous reception mode, in which the means for operating are in an inactive mode; means for receiving a wake-up signal; and means for determining whether to measure a positioning signal based on whether the wake-up signal indicates to implement the active mode during a scheduled discontinuous reception mode ON time or to skip the scheduled discontinuous reception mode ON time.

An example positioning signal processing method at a user equipment includes: operating the user equipment in a discontinuous reception mode including time interleaved ON times of the discontinuous reception mode, during which the user equipment is in an active mode monitoring for a positioning signal measurement trigger signal, and OFF times of the discontinuous reception mode, during which the user equipment is in an inactive mode; receiving a wake-up signal at the user equipment; and determining, at the user equipment, whether to measure a positioning signal based on whether the wake-up signal indicates to implement the active mode during a scheduled discontinuous reception mode ON time or to skip the scheduled discontinuous reception mode ON time.

Implementations of such a method may include one or more of the following features. The method includes measuring the positioning signal, in response to the wake-up signal indicating to skip the scheduled discontinuous reception mode ON time, without monitoring for the positioning signal measurement trigger signal. The method includes monitoring for the positioning signal measurement trigger signal in response to the wake-up signal indicating to skip the scheduled discontinuous reception mode ON time. Monitoring for the positioning signal measurement trigger signal is for a monitor duration that is less than the discontinuous reception mode ON time. Monitoring for the positioning signal measurement trigger signal includes monitoring a control channel for the positioning signal measurement trigger signal over a limited frequency range that is less than a bandwidth of the control channel. Monitoring for the positioning signal measurement trigger signal is further in response to receipt of an instruction from a network entity to monitor for the positioning signal measurement trigger signal. The instruction is included in the wake-up signal. The instruction is included in a Radio Resource Control message.

Also or alternatively, implementations of such a method may include one or more of the following features. The method includes: measuring the positioning signal in response to the wake-up signal indicating to skip the scheduled discontinuous reception mode ON time; and transmitting an aperiodic positioning information report in response to measurement of the positioning signal, and the positioning signal is an aperiodic positioning signal. The method includes: measuring the positioning signal in response to the wake-up signal indicating to skip the scheduled discontinuous reception mode ON time; and either: transmitting a positioning report of positioning information based on measuring the positioning signal; or inhibiting transmitting of the positioning report in response to receiving a report-inhibiting instruction at the user equipment from a network entity. The method includes: measuring the positioning signal in response to the wake-up signal indicating to skip the scheduled discontinuous reception mode ON time; and transmitting a positioning report of positioning information based on measuring the positioning signal and in response to at least one of measuring a threshold number of positioning reference signal resources or receiving a report request at the user equipment from a network entity. The method includes inhibiting measurement of the positioning signal in response to the wake-up signal indicating to skip the scheduled discontinuous reception mode ON time. The method includes measuring the positioning signal in response to the wake-up signal indicating to implement the active mode during the scheduled discontinuous reception mode ON time.

Another example non-transitory, processor-readable storage medium includes processor-readable instructions configured to cause a processor of a user equipment, in order to process a positioning signal, to: operate the processor in a discontinuous reception mode including time interleaved ON times of the discontinuous reception mode, in which the processor is in an active mode in which the processor monitors for a positioning signal measurement trigger signal, and OFF times of the discontinuous reception mode, in which the processor is in an inactive mode; receive a wake-up signal; and determine whether to measure the positioning signal based on whether the wake-up signal indicates to implement the active mode during a scheduled discontinuous reception mode ON time or to skip the scheduled discontinuous reception mode ON time.

An example network entity includes: a transmitter; a memory; and a processor communicatively coupled to the transmitter and the memory, where the processor is configured to: send a wake-up indication to a user equipment via the transmitter indicating to the user equipment either to implement an active mode during a scheduled discontinuous reception mode ON time or to skip the scheduled discontinuous reception mode ON time; and send a monitor indication instructing the user equipment to monitor for a positioning signal measurement trigger signal during at least a portion of the scheduled discontinuous reception mode ON time.

Another example network entity includes: first sending means, for sending a wake-up indication to a user equipment indicating to the user equipment either to implement an active mode during a scheduled discontinuous reception mode ON time or to skip the scheduled discontinuous reception mode ON time; and second sending means, for sending a monitor indication instructing the user equipment to monitor for a positioning signal measurement trigger signal during at least a portion of the scheduled discontinuous reception mode ON time.

An example method of sending positioning instructions to a user equipment includes: sending a wake-up indication to the user equipment indicating to the user equipment either to implement an active mode during a scheduled discontinuous reception mode ON time or to skip the scheduled discontinuous reception mode ON time; and sending a monitor indication instructing the user equipment to monitor for a positioning signal measurement trigger signal during at least a portion of the scheduled discontinuous reception mode ON time.

Another example non-transitory, processor-readable storage medium includes instructions configured to cause a processor, to send positioning instructions to a user equipment, to: send a wake-up indication to the user equipment indicating to the user equipment either to implement an active mode during a scheduled discontinuous reception mode ON time or to skip the scheduled discontinuous reception mode ON time; and send a monitor indication instructing the user equipment to monitor for a positioning signal measurement trigger signal during at least a portion of the scheduled discontinuous reception mode ON time.

BRIEF DESCRIPTION OF THE DRAWINGS

FIG. 10 is a table of causes of positioning reporting based on positioning signal transmission types and positioning reporting types.

FIG. 11 is a table of positioning reporting expectations corresponding to timing of the positioning reporting.

DETAILED DESCRIPTION

Figure 1:
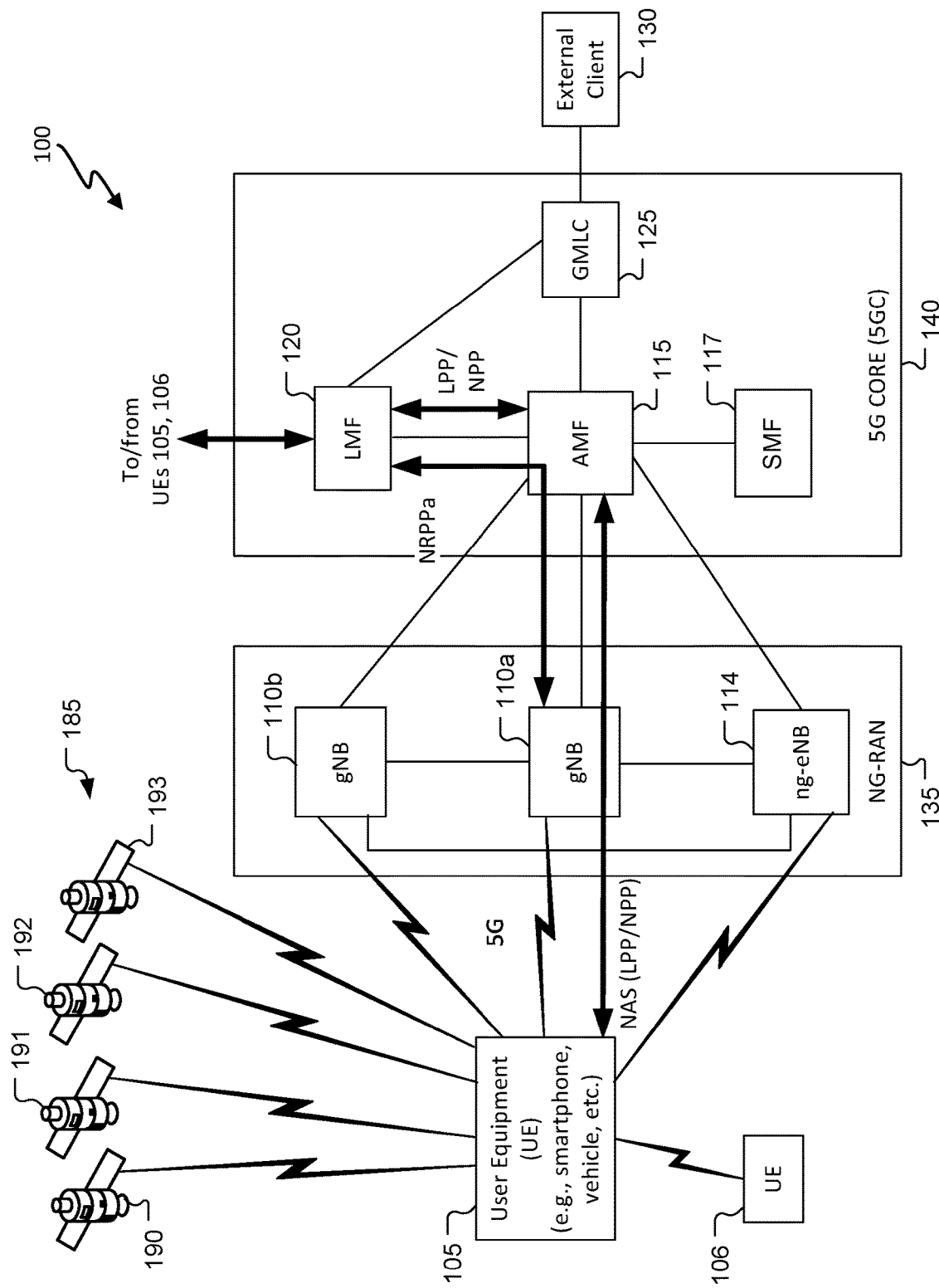
FIG. 1 is a simplified diagram of an example wireless communications system.

Techniques are discussed herein for measuring positioning signals by a UE, and reporting positioning information based thereon, while operating in a discontinuous reception mode including ON times and OFF times. For example, the UE may receive positioning signals completely within an ON time, completely within an OFF time, or partially in the ON time and partially in the OFF time. Whether the UE measures the positioning signals and, if so, what portion(s) of the positioning signals that the UE measures, may depend on the relative timing of the positioning signals and the ON time and the OFF time of the UE. The UE may report positioning information derived from the received positioning signals based on timing of a report relative to the ON times and OFF times and scheduling of the reporting, and possibly based on one or more mask and/or command values regarding reporting on one or more respective channels. As another example, a UE may analyze a wake-up signal (WUS) to determine whether and/or how to measure a positioning signal and/or whether and/or how to report positioning information. The UE may respond to the WUS indicating not to skip an ON time by measuring a positioning signal, and may respond to the WUS indicating to skip an ON time by attempting to measure, or not attempting to measure, a positioning signal. If the UE does not attempt to measure a positioning signal, the UE may not send a positioning report, or may request an uplink grant and use the grant to report positioning information. If the UE does attempt to measure a positioning signal, the UE may do so with or without monitoring for a positioning signal measurement trigger. The UE may monitor for the trigger for a small portion of the ON time or a small portion of a bandwidth of a channel for conveying the trigger. The UE may report positioning information corresponding to one or more measured positioning signals. The UE may report the positioning information conditionally, in response to satisfaction of one or more criteria, and may not report the positioning information if the UE receives an indication not to report positioning information, e.g., a particular type of positioning information. Other configurations, however, may be used.

Items and/or techniques described herein may provide one or more of the following capabilities, as well as other capabilities not mentioned. Power may be saved measuring positioning signals. Power used to power on a receive RF (radio frequency) chain and/or a transmit RF chain of a user equipment may be reduced. Latency of a positioning report may be reduced. Multiple configurations of positioning reference signals (PRS) may be used, including aperiodic PRS (A-PRS) and/or semipersistent PRS (SP-PRS), and may be used in conjunction with power-saving techniques including discontinuous reception and wake-up signals indicating to skip a discontinuous reception mode ON time. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNB s. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
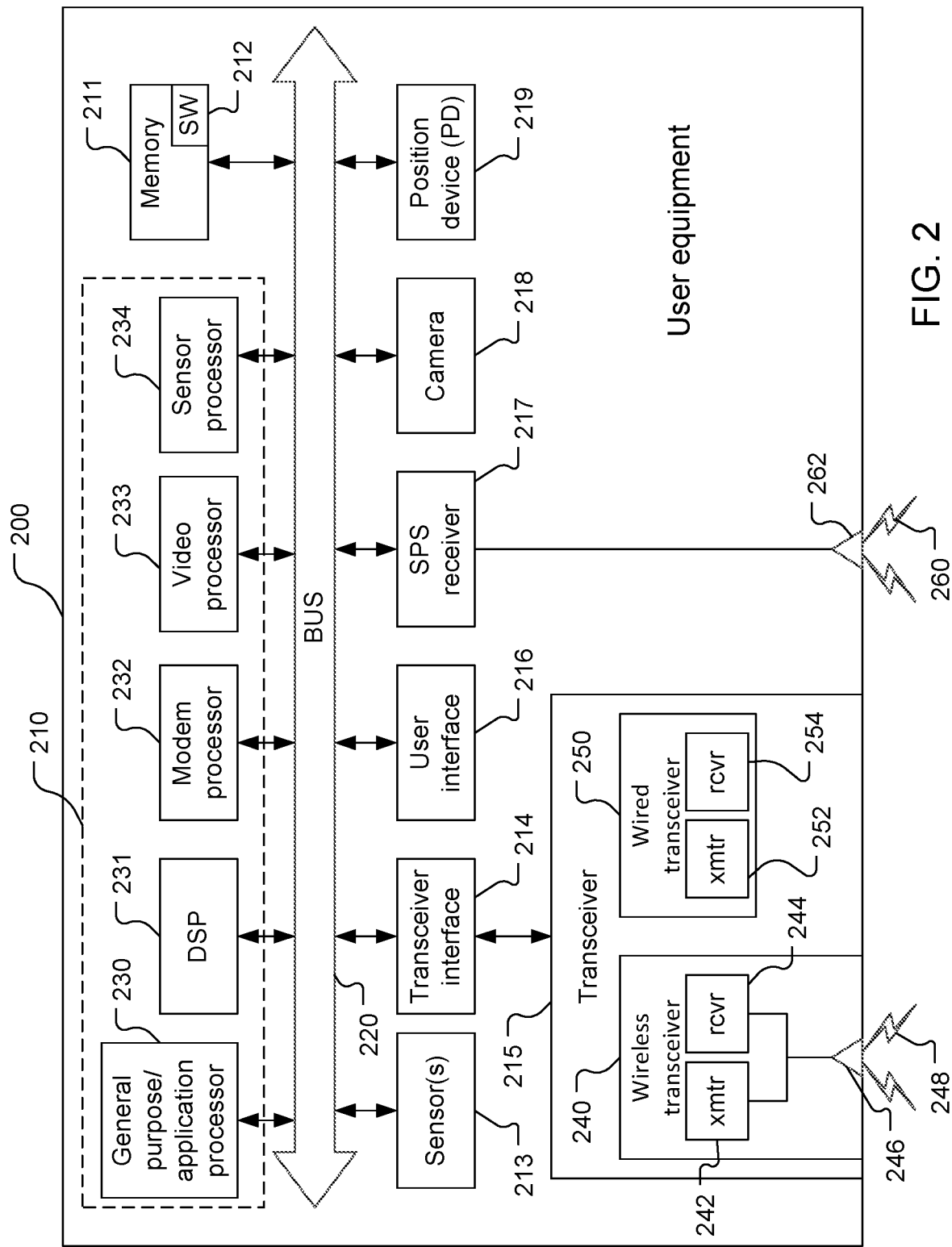
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
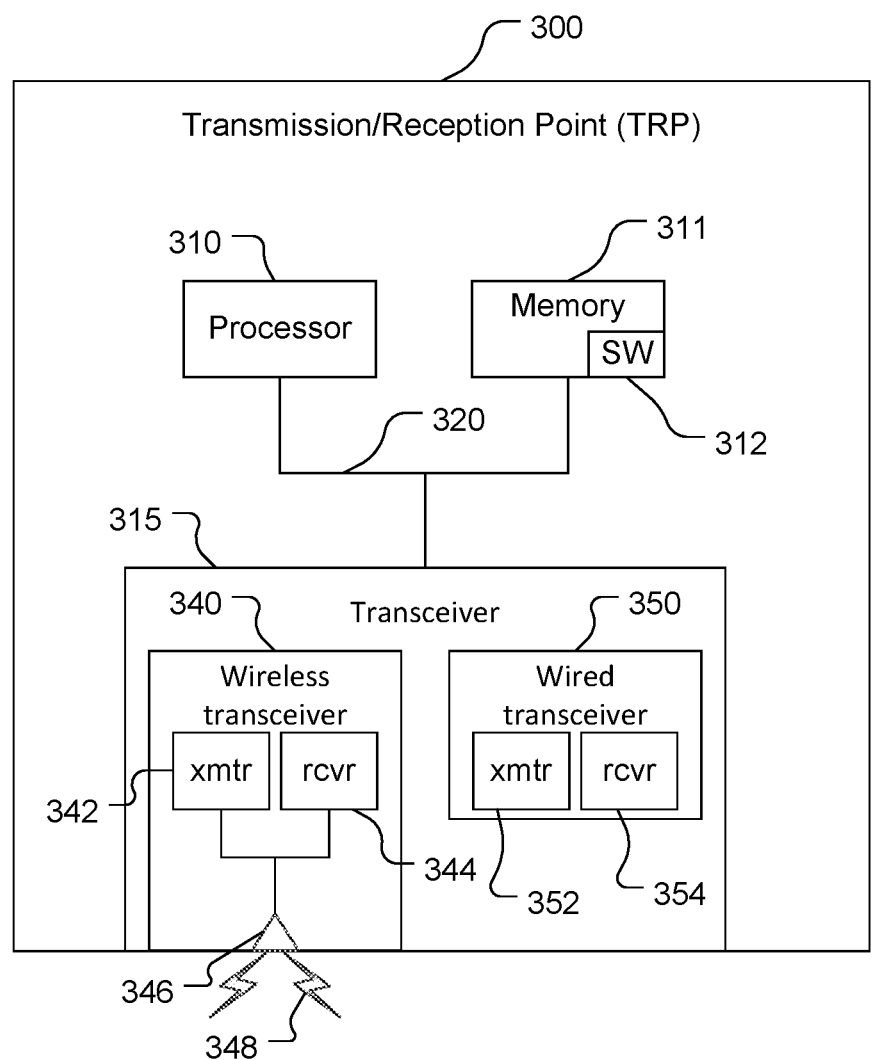
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
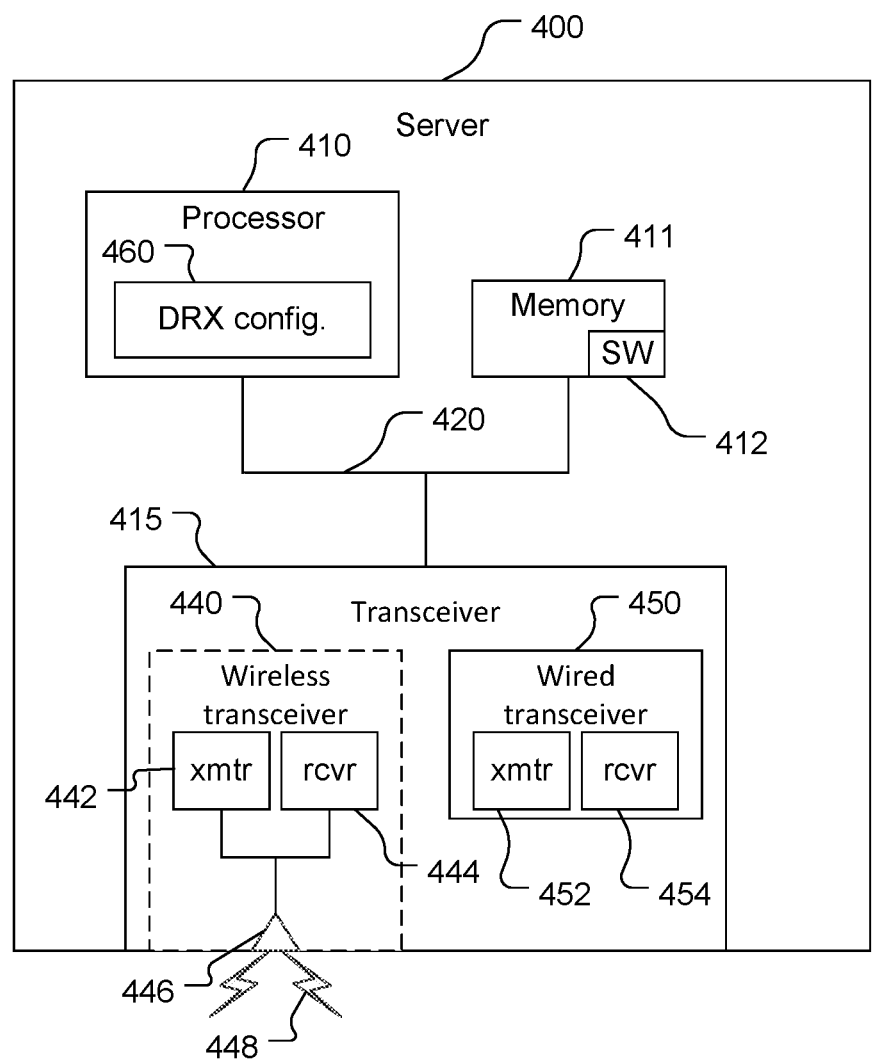
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RB s) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Discontinuous Reception

Discontinuous reception (DRX) is a mechanism in which a UE operates intermittently in a sleep mode and an active mode. The UE may enter the sleep mode from the active mode and stay in the sleep mode for a predetermined amount of time, although the time in the sleep mode may be altered, e.g., before entering the sleep mode or while in the sleep mode. The sleep mode time may be altered dynamically or in a predetermined way (e.g., according to a schedule of different sleep times). The UE may enter the active mode by waking up from the sleep mode. In "normal," non-DRX operation, the UE is in the active mode at all times and monitors a PDCCH (Physical Downlink Control CHannel) for every subframe or slot or monitoring instance as the UE is unaware of when the network will transmit data (i.e., a control signal on the PDCCH) for the UE. This non-DRX operation may consume more power than is desired and, for example, cause the UE to require charging more than desired or lack power to run one or more desired functions.

The DRX active time is the time during which the UE is monitoring the PDCCH. The active time includes times: that an ON duration timer is running; that a DRX inactivity timer is running; that a DRX retransmission timer is running; that a MAC (Media Access Control) contention resolution timer is running; that a scheduling request has been sent on PUCCH (Physical Uplink Control CHannel) and is pending; that an uplink grant for a pending HARQ (Hybrid Automatic Repeat reQuest) retransmission may occur and there are data in a corresponding HARQ buffer; that a PDCCH (communication) indicates a new transmission addressed to a C-RNTI (Cell-Radio Network Temporary Identity) of the UE has not been received after successful reception of an RAR (Random Access Response) for the preamble not selected by the UE; and in a non-contention based RA (Routing Area), until a PDCCH indicating a new transmission to the C-RNTI of the UE is received.

During the DRX inactive time, the UE may not monitor the PDCCH, but may receive and measure PRS. The UE may, however, be instructed to extend the DRX active time into the scheduled DRX inactive time, at least to monitor the PDCCH.

The UE may receive a DRX configuration from the serving cell or serving TRP of the UE. The DRX configuration may include parameters of a DRX cycle, a DRX ON duration timer, a DRX inactivity timer, a DRX retransmission timer, a short DRX cycle, and a DRX short cycle timer. The DRX cycle parameter indicates a duration of one ON time (active time, i.e., time in active mode) and one OFF time (sleep time, i.e., time in sleep mode/inactive mode). The DRX cycle may not be specified in a Radio Resource Control (RRC) signal, but be calculated from the subframe or slot time and a long DRX cycle start offset. The DRX ON duration timer indicates the duration of the ON time within one DRX cycle. The DRX inactivity timer indicates how long the UE should remain ON after reception of a PDCCH communication. This may extend the UE ON period into a time when the UE would be OFF had the UE not received the PDCCH communication. The DRX retransmission timer indicates a maximum number of consecutive PDCCH subframes or slots or monitoring instances during which the UE should remain active (ON) to wait for an incoming retransmission after a first available retransmission time. The DRX short cycle is a DRX cycle that can be implemented within the OFF time of a long DRX cycle. The DRX short cycle timer indicates a consecutive number of subframes or slots that follow the short DRX cycle after the DRX inactivity timer has expired.

Discontinuous reception may affect reference signal measurement. For NR, if the UE is configured with DRX, then the UE may not measure CSI-RS (Channel State Information—Reference Signal) resources other than during the active time based on CSI-RS-Resource-Mobility. Further, if the DRX cycle is longer than 80 ms, then the UE may not expect CSI-RS resources are available other than during the active time based on CSI-RS-Resource-Mobility. Otherwise, the UE may assume that CSI-RS are available for measurement based on CSI-RS-Resource-Mobility. For NR, regarding CSI acquisition and feedback, with DRX configured, the UE may report a CSI report if the UE receives at least one CSI-RS transmission occasion for channel measurement and a CSI-RS and/or CSI-IM (CSI-Interference Measurement) occasion in the active time no later than the CSI reference resource and may drop the report otherwise. The most recent CSI measurement occasion occurs in the DRX active time for CSI to be reported. For LTE, the UE is expected to measure outside the active DRX time, e.g., to fulfill requirements of an LPP (LTE Positioning Protocol) request.

Referring again to FIG. 4, the processor 410 (possibly in conjunction with the memory 411 and, as appropriate, (one or more portions of) the transceiver 415) includes a DRX configuration unit 460. The DRX configuration unit 460 may be configured to determine and/or provide configuration information to configure measurement behavior of a UE based on DL-PRS relative to DRX ON time and/or to configure positioning information reporting by the UE based on timing of a positioning information report (e.g., a PRS report) relative to DRX ON time. Functionality of the DRX configuration unit 460 is discussed further below, and the description may refer to the processor 410 generally, or the server 400 generally, as performing any of the functions of the DRX configuration unit 460. The server 400 may be configured to provide PRS configuration information to the TRP 300 and/or to one or more UEs to schedule transmission of PRS for measurement by another UE. The description herein, however, uses the example of the server 400 providing PRS configuration information to the TRP 300, but the description applies to providing PRS configuration information to multiple TRPs and/or to one or more UEs (e.g., for providing SL PRS or even DL PRS and/or UL PRS for measurement by a UE configured to measure such signals).

Figure 5:
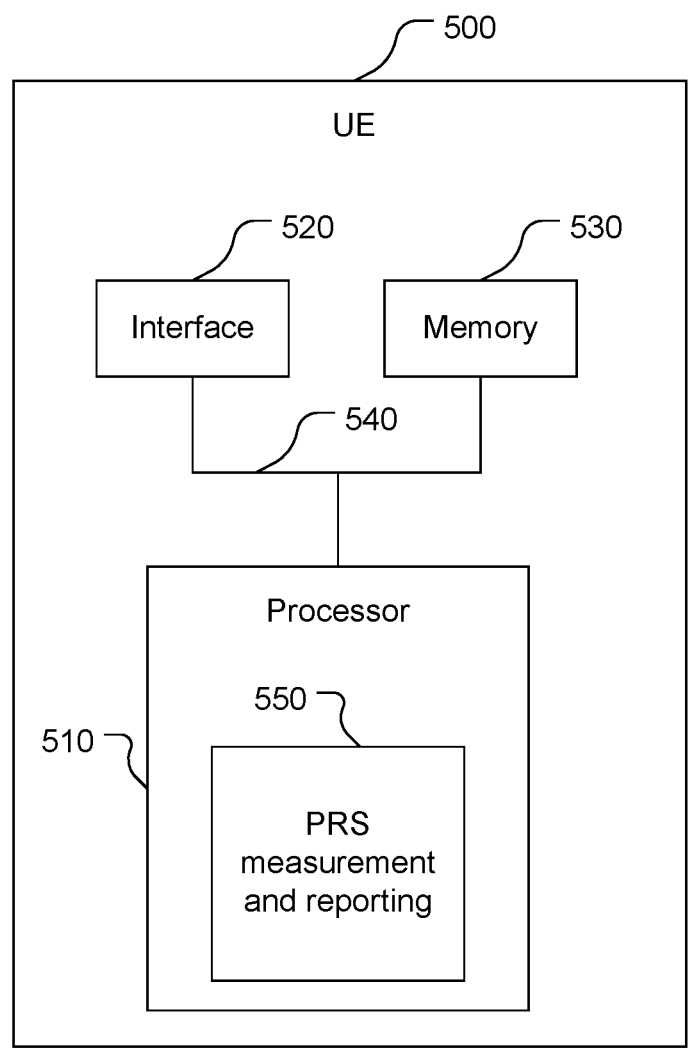
FIG. 5 is a simplified block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 500. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions. The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a PRS measurement and reporting unit 550 configured to measure positioning signals (e.g., SPS signals, PRS signals) for use in determining a position estimate for the UE 500, and for reporting positioning information (e.g., measurements, ranges, position estimates, etc.). Functionality of the PRS measurement and reporting unit 550 is discussed further below, and the description may refer to the processor 510 generally, or the UE 500 generally, as performing any of the functions of the PRS measurement and reporting unit 550.

The PRS measurement and reporting unit 550 is configured to receive DRX configuration information from the TRP 300 (e.g., a serving TRP) and to use the received DRX configuration information to implement measurement and reporting. The PRS measurement and reporting unit 550 implements PRS measurement and corresponding reporting in the presence of DRX operation (e.g., based on DRX configuration information). The DRX configuration information may include, for example, the DRX cycle, DRX ON duration timer, DRX inactivity timer, DRX retransmission timer, short DRX cycle, and DRX short cycle timer. The PRS measurement and reporting unit 550 may use the configuration information to control DRX ON times and DRX OFF times.

Figure 6:
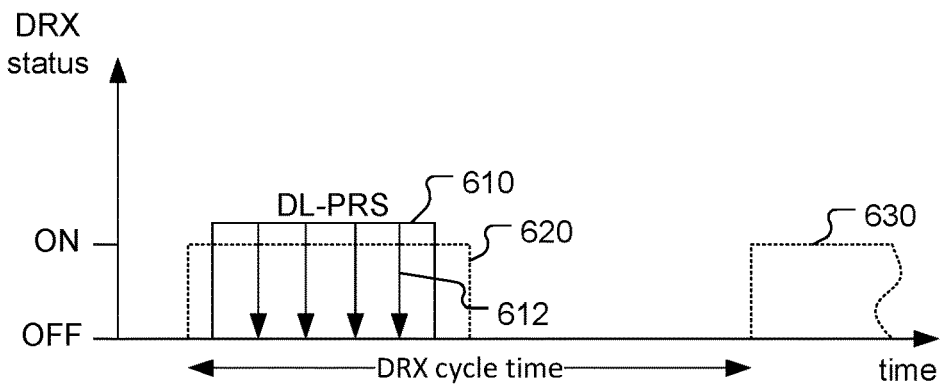
FIG. 6 is an example timing diagram of positioning signals received completely during an ON time of a discontinuous reception cycle.
Figure 7:
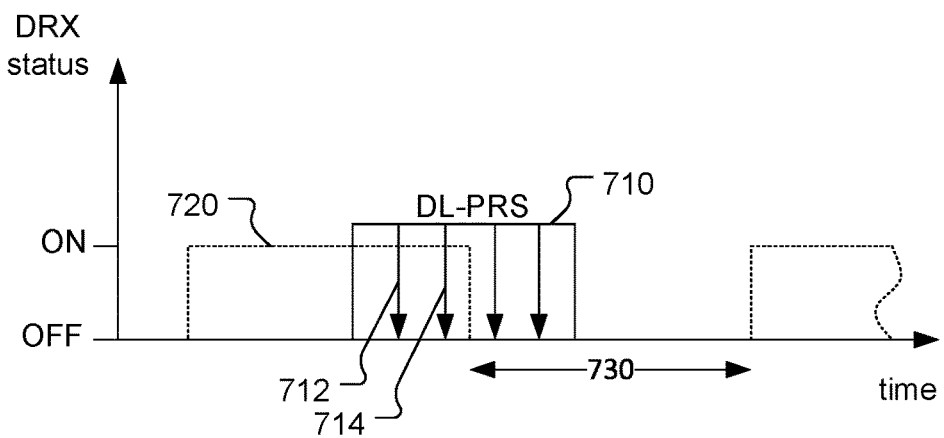
FIG. 7 is an example timing diagram of positioning signals received partially during an ON time and partially during an OFF time of a discontinuous reception cycle.
Figure 8:
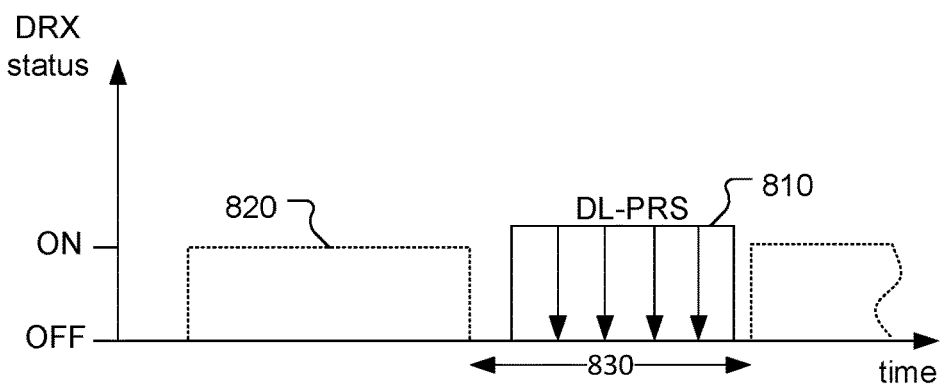
FIG. 8 is an example timing diagram of positioning signals received completely during an OFF time of a discontinuous reception cycle.

Referring also to FIGS. 6-8, various relative timings of PRS and DRX ON times may occur depending upon scheduled PRS and scheduled DRX cycles. The PRS discussed herein are DL-PRS, but the description is applicable to other PRS, e.g., SL-PRS and/or UL-PRS. As shown in FIG. 6, in a full-overlap relationship of PRS and DRX ON time, a scheduled DL-PRS occasion 610 occurs completely within a scheduled DRX ON time window 620. Thus, the DL-PRS occasion 610 fully overlaps with the DRX ON time window 620. The DRX ON time may refer to the DRX onDuration (configured by the DRX onDuration timer) or DRX active time (as discussed above, with an active time range being more dynamic, e.g., not determined at a beginning of a DL-PRS occasion). A DRX cycle time is shown as the time from a beginning of the DRX ON time window 620 to a beginning of a next DRX ON time window 630. As shown in FIG. 7, in a partial-overlap relationship of PRS and DRX ON time, a scheduled DL-PRS occasion 710 partially overlaps with a DRX ON time window 720. One portion of the DL-PRS occasion 710 overlaps with a portion of the DRX ON time window 720 and another portion of the DL-PRS occasion 710 overlaps with a portion of a DRX OFF time window 730. As shown in FIG. 8, with a zero-overlap relationship of PRS and DRX ON time, a scheduled DL-PRS occasion 810 does not overlap at all with a DRX ON time window 820, and instead fully overlaps with a DRX OFF time window 830.

The DRX configuration unit 460 of the server 400 may be configured to send DRX configuration information to the UE 500 to configure the UE 500 to implement a measurement behavior that depends on the timing relationship of the PRS relative to the DRX ON time and/or the DRX OFF time. The DRX configuration information may be sent in one or more RRC messages. The UE 500, e.g., the PRS measurement and reporting unit 550, may be statically configured (e.g., programmed during manufacture) and/or dynamically configured (e.g., in accordance with configuration information received via the interface 520, e.g., from the server 400) to implement a measurement behavior that depends on the timing relationship of the PRS relative to the DRX ON time and/or the DRX OFF time. Dynamic configuration in addition to static configuration may confirm the static configuration or alter (e.g., refine) the static configuration. For example, the UE 500 may be statically configured to implement any of multiple measurement behavior options and may be dynamically configured to implement a particular one (a selected one) of the multiple measurement behavior options. The UE 500 may be dynamically configured to change which one of the multiple measurement behavior options to implement, e.g., to implement one behavior and then to change to implement another measurement behavior for the same timing relationship of PRS to DRX ON time.

Figure 9:
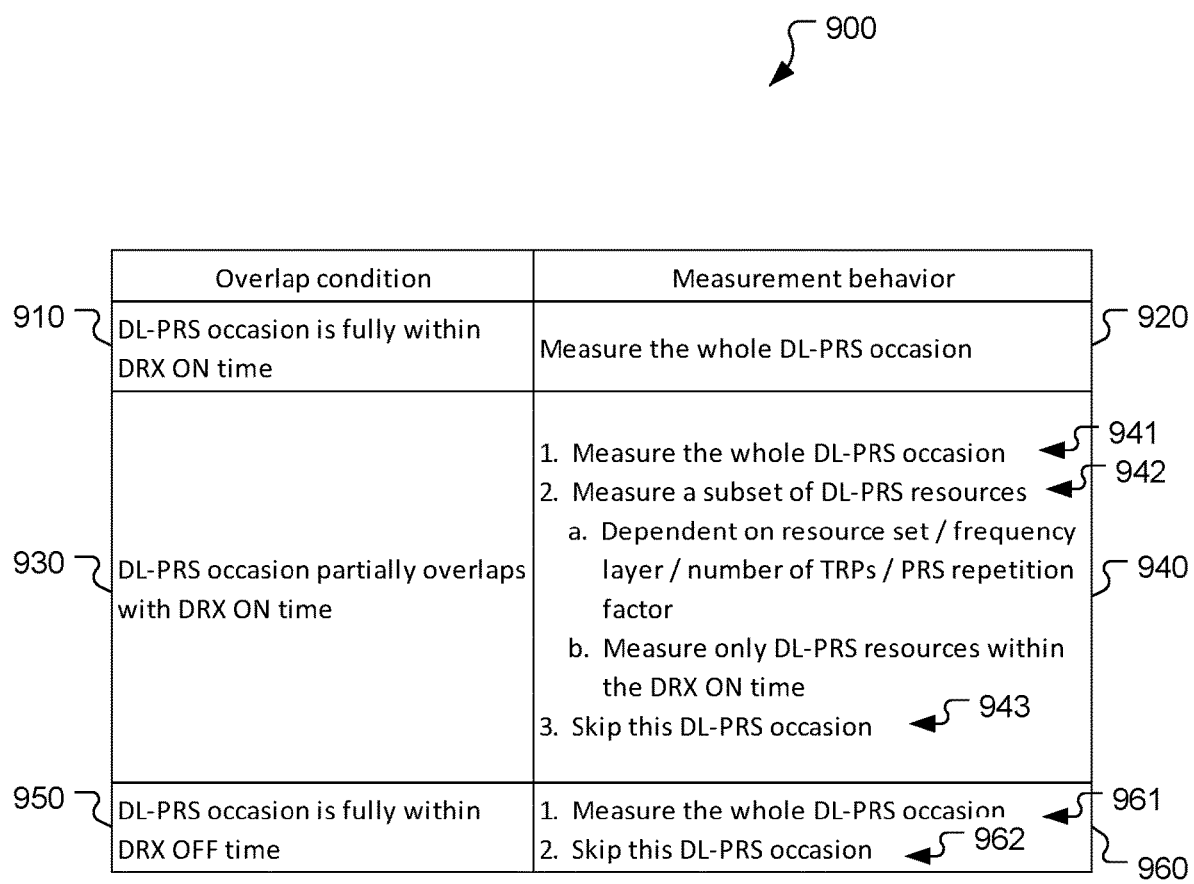
FIG. 9 is a table of measurement behaviors with corresponding overlap conditions of positioning signal reception relative to ON time and OFF time of a discontinuous reception cycle.

Referring also to FIG. 9, the UE 500 may be configured (statically and/or dynamically) to implement measurement behaviors as a function of the relative timing of PRS and DRX ON time and/or DRX OFF time in accordance with a table 900. The table 900 indicates overlap conditions of DL-PRS relative to DRX ON time of the DL-PRS being fully within a DRX ON time (fully outside a DRX OFF time), partially within a DRX ON time (partially overlapping a DRX ON time and partially overlapping a DRX OFF time), and fully outside a DRX ON time (fully within a DRX OFF time). The configuration information, as reflected in the measurement behaviors indicated in the table 900 that may be implemented by the UE 500, may cause the UE 500 to perform in accordance with the table 900, or a portion of the table 900, based on the overlap condition of the PRS and DRX ON time.

In an overlap condition 910 of a DL-PRS occasion being fully within a DRX ON time, the UE 500 may measure the DL-PRS in accordance with a measurement behavior 920. With the DL-PRS occasion fully overlapping a DRX ON time, as shown in FIG. 6, the UE 500 is configured in accordance with the measurement behavior 920 to measure the entire DL-PRS occasion 610, that may contain multiple PRS resources 612.

In an overlap condition 930 of a DL-PRS occasion partially overlapping a DRX ON time, e.g., as shown in FIG. 7, the UE 500 may measure the DL-PRS in accordance with a measurement behavior 940 that includes several measurement options 941, 942, 943. In accordance with the measurement option 941, the UE 500 may be configured to measure the whole (entire) DL-PRS occasion 710. In accordance with the measurement option 943, the UE 500 may be configured to skip the DL-PRS occasion 710 and thus not measure any of the resources of the DL-PRS occasion 710. Thus, in accordance with the measurement option 943, the UE 500 may be configured to skip the DL-PRS occasion 710, i.e., not measure that particular DL-PRS occasion. In accordance with the measurement option 942, the UE 500 may be configured to measure a subset (i.e., less than all of the PRS resources) of the DL-PRS occasion 710. The UE 500 may be configured to implement only one of the measurement options 941-943, or may be statically configured to implement two or more of the measurement options 941-943 and dynamically configured by received configuration information to implement a selected one of the measurement options 941-943, or may be statically configured to implement two or more of the measurement options 941-943 and may dynamically select one of the measurement options 941-943. For example, the UE 500 may determine which of the measurement options 941-943 to implement based on the type of DL-PRS (e.g., whether the DL-PRS is periodic (P), semipersistent (SP) (on-demand periods of periodic PRS triggered by an aperiodic signal (e.g., MAC-CE (Media Access Control—Control Element))), or aperiodic (A), i.e., P/SP/A). For example, the UE 500 may decide to implement the measurement option 941 in response to the DL-PRS being aperiodic (e.g., due to an emergency position request), to implement the measurement option 942 in response to the DL-PRS being semipersistent, and to implement the measurement option 943 in response to the DL-PRS being periodic.

Within the measurement option 942, the UE 500 may determine, or be statically and/or dynamically configured to determine, what subset of the DL-PRS occasion to measure. For example, the PRS measurement and reporting unit 550 may determine what PRS resources to measure to meet one or more criteria of a positioning technique to be implemented by the UE 500. The UE 500 may, for example, attempt to ensure that measurements from a sufficient number of different sources are obtained in order to use trilateration to determine a position estimate of the UE 500 with an acceptable error (e.g., less than a threshold error). The UE 500 may, for example, determine what DL-PRS resources to measure based on frequency layers of the resources, resource sets of the DL-PRS, a number of TRPs from which signals are to be measured, and/or PRS repetition factor(s) of the DL-PRS. For example, for DL-PRS with a repetition pattern of AABBCCDD (with A, B, C, and D representing different PRS resources) and beam sweeping, and the first three resources (AAB) overlapping with the DRX ON time, the UE 500 may determine to measure each of the resources A, B, C, and D at least once, and thus measure AABBCCD. As another example, with similar resources and beam sweeping, but with a DL-PRS pattern of ABCDABCD, and with the first resource, or the first two resources, or the first three resources, or the first four resources, overlapping with the DRX ON time, the UE 500 may determine to measure the first four resources, ABCD. As evident from these examples, the UE 500 may determine to measure resources that are received outside of the DRX ON time in order to meet the one or more criteria of the positioning technique. As another example of implementing the measurement option 942, the UE 500 may be configured (statically and/or dynamically) to measure those resources overlapping with (being received within) the DRX ON time window 720, e.g., resources 712, 714 shown in FIG. 7, without measuring resources outside the DRX ON time window.

In an overlap condition 950 of a DL-PRS occasion being fully within a DRX OFF time (not overlapping a DRX ON time at all), e.g., as shown in FIG. 8, the UE 500 may be statically and/or dynamically configured to implement a measurement behavior 960 that includes measurement options 961, 962. The measurement options 961, 962 are examples, and one or more different measurement options may be implemented instead of or in addition to either or both of the measurement options 961, 962. In the measurement option 961, the PRS measurement and reporting unit 550 measures the entire DL-PRS occasion 810. In the measurement option 962, the PRS measurement and reporting unit 550 skips the DL-PRS occasion 810 and thus does not measure any of the resources of the DL-PRS occasion 810.

The PRS measurement and reporting unit 550 may be configured to send various positioning reports, e.g., a layer 2/layer 3 (L2/L3) report or a layer 1/layer 2 (L1/L2) report. The PRS measurement and reporting unit 550 may be configured to send a scheduling request (SR) message to the network (e.g., the TRP 300 and/or the server 400) for an uplink grant to trigger a layer 2/layer 3 (L2/L3) report. For an L1/L2 report, the positioning report may be triggered by DCI (Downlink Control Information) on PDCCH, MAC-CE (on PDSCH) activated, or MAC-CE deactivated. For example, a new MAC-CE may contain a command to activate or deactivate the PRS on PDCCH.

Referring also to FIG. 10, a table 1000 shows criteria based upon which the UE 500 may be configured (statically and/or dynamically) to send an L1/L2 report of positioning information based on various combinations of positioning signal (e.g., PRS) configuration (P/SP/A) and positioning reporting configuration (P/SP/A). As shown, with periodic DL-PRS and the UE 500 configured for periodic positioning reporting, there may be no dynamic trigger/activation of positioning reporting by the UE 500, and the positioning report may be provided by the UE 500 using PUCCH (in layer 1) or using PUSCH (in layer 1 (like UCI (Uplink Control Information) on PUSCH (Physical Uplink Shared CHannel)) or layer 2). With periodic DL-PRS and the UE 500 configured for semipersistent positioning reporting, the reporting may be DCI triggered and the positioning report may be provided by the UE 500 using PUSCH (on layer 1 or layer 2). Also or alternatively, a MAC-CE may be used to activate semipersistent positioning reporting and the report may be provided by the UE 500 using PUCCH (on layer 1) or PUSCH (on layer 1 or layer 2). With periodic DL-PRS and the UE 500 configured for semipersistent positioning reporting, the reporting may be DCI triggered and the report provided using PUSCH (on layer 1 or layer 2). The UE 500 will not provide positioning reporting if the DL-PRS is scheduled for semipersistent transmission and the UE 500 is configured for periodic positioning reporting. With semipersistent DL-PRS and the UE 500 configured for semipersistent positioning reporting, the reporting may be DCI triggered and the report provided using PUSCH (on layer 1 or layer 2). Also or alternatively, a MAC-CE may be used to activate semipersistent positioning reporting and the report may be provided by the UE 500 using PUCCH (on layer 1) or PUSCH (on layer 1 or layer 2). With semipersistent DL-PRS and the UE 500 configured for aperiodic positioning reporting, the reporting may be DCI triggered and the report provided using PUSCH (on layer 1 or layer 2). The UE 500 will not provide positioning reporting if the DL-PRS is scheduled for aperiodic transmission and the UE 500 is configured for periodic or semipersistent positioning reporting. With aperiodic DL-PRS and the UE 500 configured for aperiodic positioning reporting, the reporting may be DCI triggered and the report provided using PUSCH (on layer 1 or layer 2).

Referring also to FIG. 11, a table 1100 shows parameters according to which the UE 500 may be configured (statically and/or dynamically) to send an L1/L2 report of positioning information based on timing of the positioning report (e.g., PRS report) relative to a DRX cycle, e.g., relative to a DRX ON time. As shown, for a positioning report to be sent during a DRX ON time, the PRS measurement and reporting unit 550 may be configured to send the positioning report as expected for aperiodic/semipersistent/periodic reporting, e.g., as scheduled (for semipersistent reporting or periodic reporting) or as triggered (for aperiodic reporting). The PRS measurement and reporting unit 550 may be configured to inhibit reporting based on one or more masks, e.g., by not sending a report on PUCCH in response to a PUCCH mask being set and/or by not sending a report on PUSCH in response to a PUSCH mask being set for reports that would be sent during the DRX ON time absent the mask. Outside of the DRX ON time, a PUCCH off command or PUSCH off command may be used (instead of the mask(s) for reports during the DRX ON time). The UE 500 may be configured not to send a positioning report that partially overlaps with the DRX ON time. For a positioning report to be sent during a DRX ON time, the PRS measurement and reporting unit 550 may be configured to send the positioning report as expected for aperiodic reporting which may help reduce latency. For periodic or semipersistent reporting, the PRS measurement and reporting unit 550 may be configured to send the positioning report as expected, e.g., as scheduled, but in accordance with the PUCCH mask/off command and/or the PUSCH mask/off command. For the L2/L3 report triggered by an SR sent by the UE 500, the UE 500 may be configured to send the positioning report regardless of timing relative to the DRX cycle.

Operation

Figure 12:
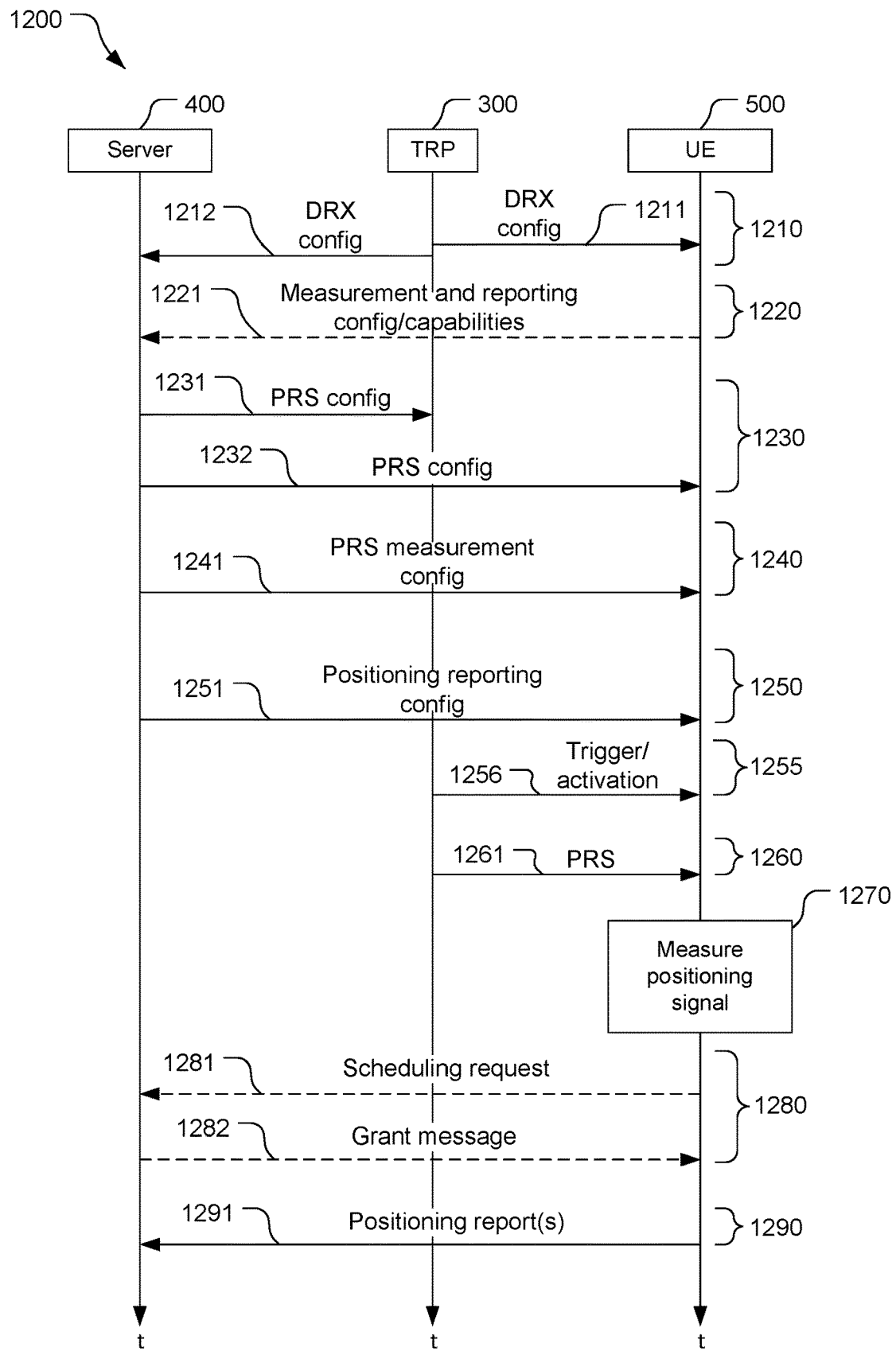
FIG. 12 is a signal and process flow for determining and reporting positioning information using a UE.

Referring to FIG. 12, with further reference to FIGS. 1-11, a signaling and process flow 1200 for determining and reporting positioning information using a UE includes the stages shown. The flow 1200 is an example only, as stages may be added, rearranged, and/or removed. For example, stage 1220 and/or stage 1280 may be omitted.

At stage 1210, the TRP 300 sends a DRX configuration message 1211 to the UE 500 and a DRX configuration message 1212 to the server 400. For example, the TRP 300 is a serving TRP for the UE 500 and sends DRX configuration information to the UE 500 in the message 1211. The DRX configuration information may include, for example, the DRX cycle, DRX ON duration timer, DRX inactivity timer, DRX retransmission timer, short DRX cycle, and DRX short cycle timer for each of two frequency ranges for reception of PRS from the TRP 300. The TRP 300 sends the message 1212 with the same information as the message 1211 such that the server 400 (e.g., an LMF) may be aware of timing of PRS relative to the DRX cycle(s) of the UE 500. The processor 310, in combination with the transceiver 315 (e.g., the wireless transmitter 342 and the antenna 346, and possibly the wired transmitter 452) and possibly in combination with the memory 311 (e.g., the software 312) may comprise means for determining, and/or means for sending, DRX configuration information. The processor 510, in combination with the interface 520 (e.g., the wireless receiver 244 and the antenna 246) and possibly in combination with the memory 530 (e.g., the software 212), may comprise means for receiving the DRX configuration. Similarly, the processor 410, in combination with the transceiver 415 (e.g., the wireless receiver 444 and the antenna 446, and/or the wired receiver 454) and possibly in combination with the memory 411 (e.g., the software 412), may comprise means for receiving the DRX configuration.

At stage 1220, the UE 500 may send a measurement and reporting configuration/capability(ies) message 1221 to the server 400. The message 1221 may indicate a configuration of the UE 500 regarding measurement behavior for measuring positioning signals (e.g., PRS) in view of DRX mode operation of the UE 500. For example, the message 1221 may indicate static configuration of the UE 500 for measuring PRS in accordance with one or more of the behaviors shown in the table 900. The message 1221 may also or alternatively indicate a configuration of the UE 500 regarding positioning information reporting in view of DRX mode operation of the UE 500. For example, the message 1221 may indicate static configuration of the UE 500 for sending positioning reports (e.g., positioning measurement(s), range(s), position estimate(s), etc.) in accordance with one or more of the trigger conditions shown in the table 1000 and/or one or more of the timing parameters or conditions for reporting shown in the table 1100. The processor 510, in combination with the interface 520 (e.g., the wireless transmitter 242 and the antenna 246) and possibly in combination with the memory 530 (e.g., the software 212), may comprise means for transmitting a measurement and reporting configuration/capability(ies) message.

At stage 1230, the server 400 may send a PRS configuration message 1231 to the TRP 300 and a PRS configuration message 1232 to the UE 500. The PRS configuration message 1231 instructs the TRP 300 to send PRS to the UE 500 in accordance with appropriate transmission parameters, e.g., timing, frequency layer, offset(s), etc. The PRS configuration message 1232 provides information regarding reception of the PRS to be transmitted by the TRP 300, e.g., timing, frequency layer, offset(s), etc. While the flow 1200 shows one TRP 300 and PRS configuration being provided to that TRP, the server 400 may send PRS configuration information to multiple TRPs and provide corresponding configuration information for the multiple TRPs to the UE 500. The configuration message 1232 may provide information for receiving PRS, e.g., DL-PRS, SL-PRS, and/or UL-PRS (e.g., depending on capabilities of the UE 500). The PRS configurations may be configurations decided by the server 400 and the TRP 300 together, with the messages 1231, 1232 being indicative of the information determined/ provided. For example, the message 1232 may be provided by the TRP 300 to the UE 500 or by the server 400 via the TRP 300 to the UE 500. The processor 410, in combination with the transceiver 415 (e.g., the wireless transmitter 442 and the antenna 446, and possibly the wired transmitter 452) and possibly in combination with the memory 411, may comprise means for transmitting the PRS configuration message(s).

At stage 1240, the server 400 may send a PRS measurement configuration message 1241 to the TRP 300 and to the UE 500. The message 1241 is shown being sent from the server 400 to the UE 500 directly, but a configuration message may also or alternatively be sent from the server 400 to the TRP 300 and from the TRP 300 to the UE 500 (or via another path not including the TRP 300). The message 1241 may dynamically configure the UE 500 for measuring PRS, or skipping measuring PRS, based on relative timing of the PRS and a DRX ON time, e.g., according to one or more of the behaviors shown in the table 900. The UE 500 may be configured to use any statically-configured behavior as a default behavior to be followed in the absence of dynamic configuration information received from the server 400. The UE 500 may be configured to override any statically-configured behavior in response to receiving conflicting dynamic configuration information received from the server 400 (e.g., overriding the statically-configured measurement option 941 with the measurement option 942 in response to the message 1241 instructing the UE 500 to implement the measurement option 942). The configuration information in the message 1241 may be time limited, and the UE 500 may be configured to revert to any statically-configured behavior upon expiration of a time limit of the message 1241. The TRP 300 may use the configuration in the message 1241 to arrange a time slot for an uplink report from the UE 500. The processor 410, in combination with the transceiver 415 (e.g., the wireless transmitter 442 and the antenna 446, and possibly the wired transmitter 452) and possibly in combination with the memory 411, may comprise means for transmitting the PRS measurement configuration message(s).

At stage 1250, the server 400 may send a positioning reporting configuration message 1251 to the UE 500. As with the message 1241, the message 1251 may be sent directly or indirectly to the UE 500, as one or more messages. The message 1251 may, for example, dynamically configure the UE 500 with conditions for reporting positioning information, e.g., trigger conditions as shown in the table 1000. The message 1251 may also or alternatively dynamically configure the UE 500 with one or more reporting behaviors for reporting positioning information based on timing of the reporting relative to a DRX cycle, e.g., in accordance with the behaviors shown in the table 1100. For example, the message 1251 may configure the UE 500 to respond to a PUCCH mask/off command and/or a PUSCH mask/off command to refrain from sending a positioning report (e.g., a PRS report) on the PUCCH and/or the PUSCH, respectively. The processor 410, in combination with the transceiver 415 (e.g., the wireless transmitter 442 and the antenna 446, and possibly the wired transmitter 452) and possibly in combination with the memory 411, may comprise means for transmitting the positioning reporting configuration message(s). While the PRS configuration message 1232, the PRS measurement configuration message 1241, and the positioning reporting configuration message 1251 are shown separately, two or even all three of these messages may be transmitted jointly, e.g., within a single LMF assistance data message.

At stage 1255, a trigger/activation message 1256 may be sent from the TRP 300 to the UE 500. The trigger/activation message 1256 may be a DCI to trigger aperiodic PRS measurement and/or may activate semipersistent PRS measurement. The message 1256 may indicate what PRS to measure and how to report (e.g., available slot, channel, etc.). Reporting of positioning information based on aperiodic PRS and/or semipersistent PRS may be based on reporting configuration information provided by the TRP 300 in the message 1256 and/or in the positioning reporting configuration message 1251, e.g., for L1/L2 reports. The processor 310, in combination with the transceiver 315 (e.g., the wireless transmitter 342 and the antenna 346) and possibly in combination with the memory 311, may comprise means for transmitting a trigger/activation message.

At stage 1260, the TRP 300 transmits the PRS 1261 to the UE 500. The TRP 300 sends the PRS to the UE 500 in accordance with the PRS configuration message 1231 sent to the TRP 300 from the server 400 (e.g., an LMF). The processor 310, in combination with the transceiver 315 (e.g., the wireless transmitter 342 and the antenna 346) and possibly in combination with the memory 311, may comprise means for transmitting PRS.

At stage 1270, the UE 500 implements an appropriate measurement behavior in accordance with the static and/or dynamic measurement configuration of the UE 500. For example, the UE 500 may determine the timing of the PRS relative to timing of a DRX ON time and implement the corresponding measurement behavior, in accordance with the table 900, for which the UE 500 is configured. The PRS measurement and reporting unit 550 may implement one of the measurement behaviors 920, 940, 960 in accordance with whether the DL-PRS from stage 1260 is scheduled to arrive fully within a DRX ON time, partially within and partially outside a DRX ON time, or fully outside a DRX ON time (fully in a DRX OFF time), respectively. The processor 510, in combination with the interface 520 (e.g., the wireless receiver 244 and the antenna 246) and possibly in combination with the memory 530 (e.g., the software 212), may comprise means for measuring PRS.

At stage 1280, the UE 500 may send a scheduling request 1281 to the TRP 300 (e.g., a gNB) and the TRP 300 may send an uplink (UL) grant message 1282. For example, the UE 500 may send the SR 1281 to the TRP 300 requesting an uplink grant for the UE 500 to send an L2/L3 positioning report, and the TRP 300 may, in response to receiving the SR 1281, send the UL grant message 1282 giving the UE 500 one or more UL parameters (e.g., a slot) for sending positioning information in an L2/L3 report. The processor 510, in combination with the interface 520 (e.g., the wireless receiver 244 and the antenna 246) and possibly in combination with the memory 530 (e.g., the software 212), may comprise means for transmitting a scheduling request. The processor 310, in combination with the transceiver 315 (e.g., the wireless transmitter 342 and the antenna 346, and possibly the wireless receiver 344), and possibly in combination with the memory 311, may comprise means for transmitting a grant message.

At stage 1290, the UE 500 sends one or more positioning reports 1291, e.g., an L1/L2 positioning report and/or an L3 positioning report (e.g., a PRS report) in accordance with a static and/or dynamic positioning reporting configuration of the UE 500 and timing of the report relative to a DRX cycle. For example, the PRS measurement and reporting unit 550 may send the positioning report(s) 1291 including positioning information (e.g., measurement(s), range(s), position estimate(s), etc.) in accordance with the conditions shown in the table 1000 and may send the positioning report(s) 1291 in accordance with the report timing shown in the table 1100. The PRS measurement and reporting unit 550 may withhold sending of reports on the PUCCH and/or the PUSCH in accordance with mask settings if the report is scheduled to be sent within a DRX ON time for A/SP/P reporting, or in accordance with off commands if the report is scheduled to be sent within a DRX OFF time for P/SP reporting. The L1/L2 positioning report may be sent according to reporting configuration provided by the positioning reporting configuration message 1251 and/or the trigger/activation message 1256 and/or the UL grant message 1282 (for L2), e.g., as UCI on PUCCH or PUSCH or a MAC-CE. The L3 positioning report may be sent to the TRP 300 and to the server 400 (e.g., LMF which may be physically incorporated into the TRP 300) in accordance with the UL grant message 1282, e.g., as a MAC-PDU (MAC-Packet Data Unit). The processor 510, in combination with the interface 520 (e.g., the wireless receiver 244 and the antenna 246) and possibly in combination with the memory 530 (e.g., the software 212), may comprise means for transmitting the positioning report(s).

Figure 13:
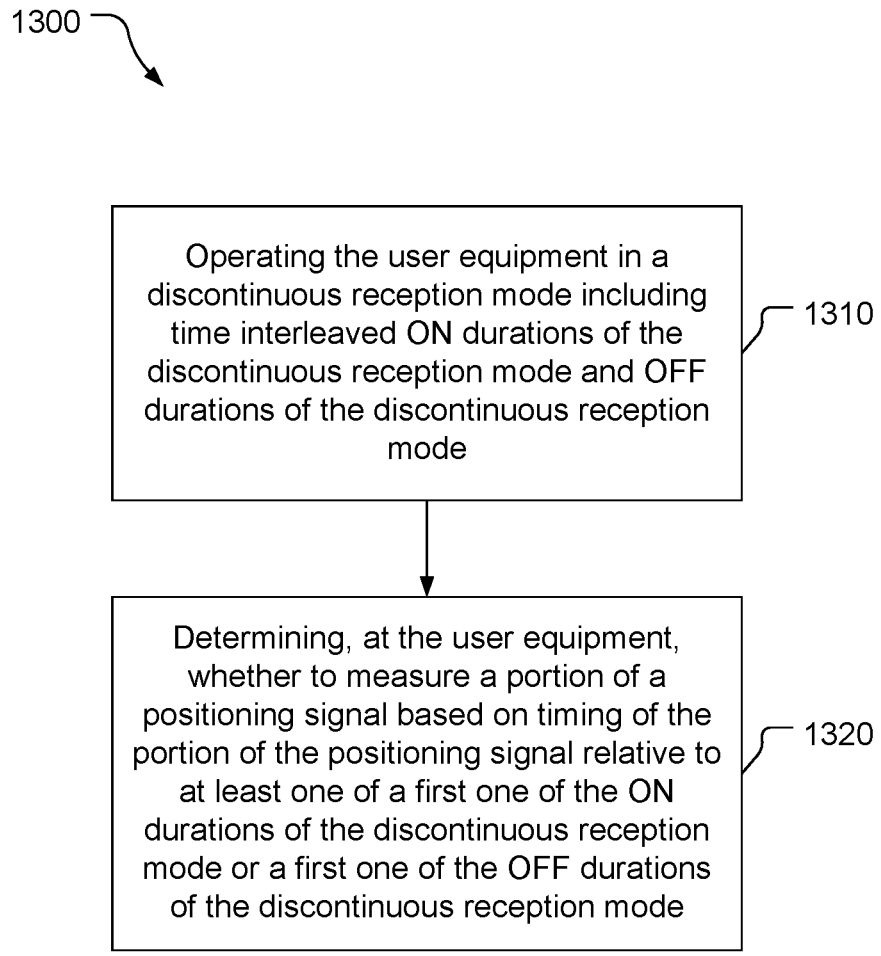
FIG. 13 is a block flow diagram of a method of performing positioning operations at a UE.

Referring to FIG. 13, with further reference to FIGS. 1-12, a method 1300 of performing positioning operations at a UE includes the stages shown. The method 1300 is, however, an example only and not limiting. The method 1300 may be altered, e.g., by having stages added, removed, rearranged, combined, performed concurrently, and/or having single stages split into multiple stages.

At stage 1310, the method 1300 includes operating the user equipment in a discontinuous reception mode including time interleaved ON times of the discontinuous reception mode and OFF times of the discontinuous reception mode. For example, the UE 500 cycles through DRX active and inactive modes in accordance with parameters provided to the UE 500 in the DRX configuration message 1211 from the TRP 300 (the serving TRP for the UE 500). The UE 500 alternates between periods of monitoring the PDCCH and periods of not monitoring the PDCCH. The processor 510, in combination with the interface 520 (e.g., the wireless receiver 244 and the antenna 246) and possibly in combination with the memory 530 (e.g., the software 212), may comprise means for operating in a discontinuous reception mode.

At stage 1320, the method 1300 includes determining, at the user equipment, whether to measure a portion of a positioning signal based on timing of the portion of the positioning signal relative to at least one of a first one of the ON times of the discontinuous reception mode or a first one of the OFF times of the discontinuous reception mode. For example, the UE 500 may implement a measurement behavior based on which circumstance exists regarding a DL-PRS occasion and DRX cycle. The UE 500 may, for example, implement a measurement behavior depending on whether a DL-PRS occasion is fully within a DRX ON time (as known to the UE 500 due to scheduling of the DL-PRS and scheduled DRX ON times and scheduled DRX OFF times), partially overlapping a DRX ON time and partially overlapping a DRX OFF time, or fully within a DRX OFF time. The UE 500 may implement the measurement behavior in accordance with, for example, the table 900. The UE 500 may be configured statically and/or dynamically (e.g., through the PRS measurement configuration message 1241) to implement a measurement behavior in each of such circumstances. The UE 500 may determine which behavior to implement if the UE 500 is configured to implement more than one behavior for a given timing circumstance. The processor 510, possibly in combination with the interface 520 (e.g., the wireless receiver 244 and the antenna 246) and possibly in combination with the memory 530 (e.g., the software 212), may comprise means for determining whether to measure a portion of a positioning signal.

The method 1300 may include one or more of the following features. In an example implementation, the method 1300 may include at least one of: measuring all of the portion of the positioning signal in response to a first part of the portion of the positioning signal being scheduled to arrive during the first one of the ON times and a second part of the portion of the positioning signal being scheduled to arrive during the first one of the OFF times; or measuring a third part of the portion of the positioning signal in response to the first part of the portion of the positioning signal being scheduled to arrive during the first one of the ON times and the second part of the portion of the positioning signal being scheduled to arrive during the first one of the OFF times, the third part of the positioning signal being less than the portion of the positioning signal; or inhibiting measuring any of the portion of the positioning signal in response to the first part of the portion of the positioning signal being scheduled to arrive during the first one of the ON times and the second part of the portion of the positioning signal being scheduled to arrive during the first one of the OFF times. The UE 500 may, for example, be configured to implement one or more of the measurement options 941-943. The processor 510, in combination with the interface 520 (e.g., the wireless receiver 244 and the antenna 246) and possibly in combination with the memory 530 (e.g., the software 212), may comprise means for measuring all of the portion of the positioning signal and/or means for measuring a third part of the portion of the positioning signal. The processor 510, possibly in combination with the memory 530 (e.g., the software 212), may comprise means for inhibiting measuring any of the portion of the positioning signal. In another example, implementation, the method 1300 may include receiving configuration information at the user equipment; and determining, based on the configuration information, whether to measure all of the portion of the positioning signal, or measure the third part of the portion of the positioning signal, or avoid measuring any of the portion of the positioning signal, in response to the first part of the portion of the positioning signal being scheduled to arrive during the first one of the ON times and the second part of the portion of the positioning signal being scheduled to arrive during the first one of the OFF times. The UE 500 may, for example, be statically configured to implement any of the measurement options 941-943 and be dynamically configured, e.g., based on the PRS measurement configuration message 1241, to determine which one of the measurement options 941-943 to implement. The processor 510, in combination with the interface 520 (e.g., the wireless receiver 244 and the antenna 246) and possibly in combination with the memory 530 (e.g., the software 212), may comprise means for receiving the configuration information. The processor 510, possibly in combination with the memory 530 (e.g., the software 212), may comprise means for determining whether to measure all of the portion of the positioning signal, or measure the third part of the portion of the positioning signal, or inhibit measuring any of the portion of the positioning signal.

Also or alternatively, implementations of the method 1300 may include one or more of the following features. In an example implementation, the method 1300 may include: measuring a third part of the portion of the positioning signal in response to a first part of the portion of the positioning signal being scheduled to arrive during the first one of the ON times and a second part of the portion of the positioning signal being scheduled to arrive during the first one of the OFF times, the third part of the positioning signal being less than the portion of the positioning signal; and determining the third part of the portion of the positioning signal at least one of: based on at least one of a resource set, a frequency layer, a number of sources of the portion of the positioning signal, or a repetition factor of the positioning signal; or as the first part of the portion of the positioning signal. The UE 500 may, for example, implement the measurement option 942 and determine what subset of DL-PRS resources to measure based on one or more of the listed parameters (e.g., a number of sources (e.g., TRPs) of the PRS resources), or have the subset of the DL-PRS resources be whichever resources are (scheduled to be) received during the DRX ON time, e.g., to meet one or more criteria such as positioning accuracy. The processor 510, in combination with the interface 520 (e.g., the wireless receiver 244 and the antenna 246) and possibly in combination with the memory 530 (e.g., the software 212), may comprise means for measuring a third part of the portion of the positioning signal and the processor 510, possibly in combination with the memory 530 (e.g., the software 212), may comprise means for determining the third part of the portion of the positioning signal.

Also or alternatively, implementations of the method 1300 may include one or more of the following features. In an example implementation, the method 1300 may include measuring all of the portion of the positioning signal in response to all of the positioning signal being scheduled to arrive in the first one of the ON times of the discontinuous reception mode. The UE 500 may, for example, be configured to implement the measurement behavior 920. The processor 510, in combination with the interface 520 (e.g., the wireless receiver 244 and the antenna 246) and possibly in combination with the memory 530 (e.g., the software 212), may comprise means for measuring all of the portion of the positioning signal. In another example implementation, the method 1300 may include at least one of: measuring all of the portion of the positioning signal in response to all of the positioning signal being scheduled to arrive in the first one of the OFF times of the discontinuous reception mode; or inhibiting measuring any of the portion of the positioning signal in response to all of the positioning signal being scheduled to arrive in the first one of the OFF times of the discontinuous reception mode. The UE 500 may, for example, be statically and/or dynamically configured to implement one or more of the measurement options 961, 962. The processor 510, in combination with the interface 520 (e.g., the wireless receiver 244 and the antenna 246) and possibly in combination with the memory 530 (e.g., the software 212), may comprise means for measuring all of the portion of the positioning signal. The processor 510, possibly in combination with the memory 530 (e.g., the software 212), may comprise means for inhibiting measuring of any of the portion of the positioning signal. In another example implementation, the method 1300 may include receiving configuration information at the user equipment; and responding to the configuration information by either measuring all of the portion of the positioning signal, or inhibiting measuring any of the portion of the positioning signal, in response to all of the positioning signal being scheduled to arrive in the first one of the OFF times of the discontinuous reception mode. The UE 500 may, for example, receive the PRS measurement configuration message 1241 and be dynamically configured by the message 1241 to implement one of the measurement options 961, 962. The processor 510, in combination with the interface 520 (e.g., the wireless receiver 244 and the antenna 246) and possibly in combination with the memory 530 (e.g., the software 212), may comprise means for receiving configuration information. The processor 510, possibly in combination with the memory 530 (e.g., the software 212), may comprise means for responding to the configuration information by either measuring all of the portion of the positioning signal or inhibiting measuring any of the portion of the positioning signal.

Also or alternatively, implementations of the method 1300 may include one or more of the following features. In an example implementation, the method 1300 may include transmitting a scheduling request to a network entity for an uplink grant to transmit a positioning report above layer 1 or layer 2, or using MAC-CE. The UE 500 may send a scheduling request for the server 400 to give the UE 500 an uplink grant to send a positioning report on layer 3 (e.g., using LPPa). The processor 510, in combination with the interface 520 (e.g., the wireless transmitter 242 and the antenna 246) and possibly in combination with the memory 530 (e.g., the software 212), may comprise means for transmitting a scheduling request. In another example implementation, the method 1300 may include: transmitting a positioning report at least one of asynchronously, semi-persistently, or periodically; and at least one of: inhibiting transmitting of the positioning report during a second one of the ON times of the discontinuous reception mode based on an uplink report flag being received from a network entity; or inhibiting transmitting of the positioning report based on the uplink report flag being received from the network entity, and the positioning report being semi-persistent or periodic and being scheduled to be sent during a second one of the OFF times of the discontinuous reception mode. For example, the UE 500 may send a P/SP/A positioning report and withhold sending a report on PUCCH and/or PUSCH based on whether respective masks are set to inhibit such reporting during an ON time or based on whether respective off commands are set to inhibit P/SP reporting during an OFF time. The processor 510, in combination with the interface 520 (e.g., the wireless transmitter 242 and the antenna 246) and possibly in combination with the memory 530 (e.g., the software 212), may comprise means for transmitting a positioning report. The processor 510, possibly in combination with the memory 530 (e.g., the software 212), may comprise means for inhibiting transmitting of the positioning report.

Figure 14:
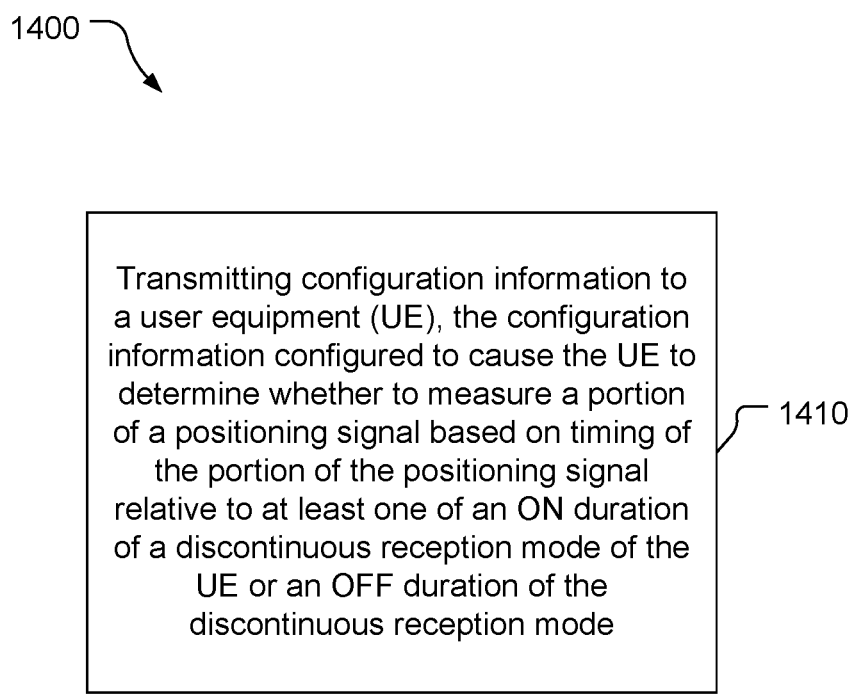
FIG. 14 is a block flow diagram of a method of configuring a UE.

Referring to FIG. 14, with further reference to FIGS. 1-13, a method 1400 of configuring a UE includes the stages shown. The method 1400 is, however, an example only and not limiting. The method 1400 may be altered, e.g., by having stages added and/or having a single stage split into multiple stages.

At stage 1410, the method 1400 includes transmitting configuration information to a UE, the configuration information configured to cause the UE to determine whether to measure a portion of a positioning signal based on timing of the portion of the positioning signal relative to at least one of an ON time of a discontinuous reception mode of the UE or an OFF time of the discontinuous reception mode. For example, the server 400 PRS may transmit the measurement configuration message 1241 to the UE 500 to dynamically configure the UE to implement the table 900, including to determine which of the measurement behaviors 920, 940, 960 to implement based on the respective overlap condition 910, 930, 950. The processor 410, in combination with the transceiver 415 (e.g., the wireless transmitter 442 and the antenna 446) and possibly in combination with the memory 411, may comprise means for transmitting configuration information to a UE. Also or alternatively, the processor 310, in combination with the transceiver 315 (e.g., the wireless transmitter 342 and the antenna 346) and possibly in combination with the memory 311, may comprise means for transmitting configuration information to a UE.

Implementations of the method 1400 may include one or more of the following features. In an example implementation, the configuration information may be configured to cause the UE to at least one of: measure all of the portion of the positioning signal in response to a first part of the portion of the positioning signal being scheduled to arrive during the ON time and a second part of the portion of the positioning signal being scheduled to arrive during the OFF time; or measure a third part of the portion of the positioning signal in response to the first part of the portion of the positioning signal being scheduled to arrive during the ON time and the second part of the portion of the positioning signal being scheduled to arrive during the OFF time, the third part of the positioning signal being less than the portion of the positioning signal; or inhibit measuring any of the portion of the positioning signal in response to the first part of the portion of the positioning signal being scheduled to arrive during the ON time and the second part of the portion of the positioning signal being scheduled to arrive during the OFF time. For example, the PRS measurement configuration message 1241 may cause the UE 500 to implement, or be able to implement, one or more of the measurement options 941-943. The PRS measurement configuration message 1241 may, for example, dynamically configure the UE 500 to be able to implement one or more of the measurement options 941-943. In another example implementation, the configuration information is configured to cause the UE to measure all of the portion of the positioning signal, or measure the third part of the portion of the positioning signal, or inhibit measuring any of the portion of the positioning signal, in response to the first part of the portion of the positioning signal being scheduled to arrive during the ON time and the second part of the portion of the positioning signal being scheduled to arrive during the OFF time. For example, the server 400 may configure the PRS measurement configuration message 1241 to cause the UE to measure all, some, or none of the PRS based on the PRS being scheduled to arrive partially in a DRX ON time and partially in a DRX OFF time of the UE 500. The UE 500 may be statically or dynamically configured to implement two or more of the measurement options 941-943 and the measurement configuration message 1241 may instruct the UE 500 which of the measurement options 941-943 to implement in response to PRS partially overlapping a DRX ON time and partially overlapping a DRX OFF time of the UE 500.

Also or alternatively, implementations of the method 1400 may include one or more of the following features. In an example implementation, the configuration information may be configured to cause the UE to: measure a third part of the portion of the positioning signal in response to a first part of the portion of the positioning signal being scheduled to arrive during the ON time and a second part of the portion of the positioning signal being scheduled to arrive during the OFF time, the third part of the positioning signal being less than the portion of the positioning signal; and determine the third part of the portion of the positioning signal at least one of: based on at least one of a resource set, a frequency layer, a number of sources of the portion of the positioning signal, or a repetition factor of the positioning signal; or as the first part of the portion of the positioning signal. For example, the message 1241 may cause the UE 500 to implement the measurement option 942 and to determine what subset of DL-PRS resources to measure based on one or more of the listed parameters (e.g., a number of sources (e.g., TRPs) of the PRS resources), or have the subset of the DL-PRS resources be whichever resources are (scheduled to be) received during the DRX ON time, e.g., to meet one or more criteria such as positioning accuracy. In another example implementation, the configuration information may be configured to cause the UE to measure all of the portion of the positioning signal in response to all of the positioning signal being scheduled to arrive in the ON time of the discontinuous reception mode.

Also or alternatively, implementations of the method 1400 may include one or more of the following features. In an example implementation, the configuration information may be configured to cause the UE to either: measure all of the portion of the positioning signal in response to all of the positioning signal being scheduled to arrive in the OFF time of the discontinuous reception mode; or inhibit measuring any of the portion of the positioning signal in response to all of the positioning signal being scheduled to arrive in the OFF time of the discontinuous reception mode. The PRS measurement configuration message 1241 may dynamically configure the UE 500 (that may be configured to implement either of the measurement options 961, 962) to implement one of the measurement options 961, 962. In another example implementation, the configuration information may be configured to cause the UE to: transmit a positioning report at least one of semi-persistently or periodically; and inhibit transmitting of the positioning report based on an uplink report flag in the configuration information. For example, the server 400 may send the positioning reporting configuration message 1251 to dynamically configure the UE 500 to report positioning information in accordance with the table 1100, including inhibiting transmitting a report over PUCCH and/or PUSCH based on values of respective masks/off commands.

DRX and Wake-Up Signals

Figure 15:
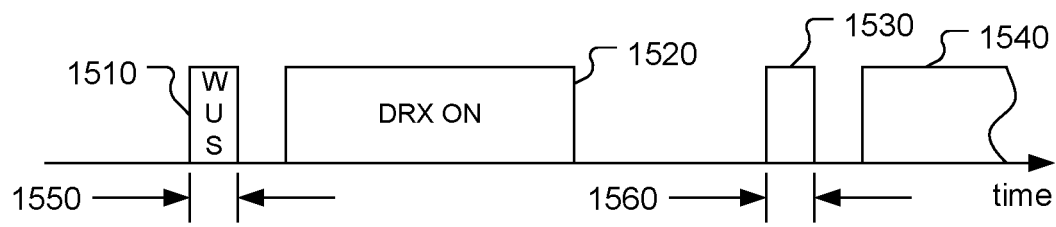
FIG. 15 is a simplified timing diagram of wake-up signals and discontinuous reception mode ON times.

Referring again to FIGS. 4-6 and 12, with further reference to FIG. 15, the UE 500 may be configured to monitor a wake-up signal (WUS) 1510 and a WUS 1530 received outside DRX ON times 1520, 1540. The server 400 may be configured to cause the TRP 300 to send the WUS 1510, 1530, or the TRP 300 may be configured to produce and send the WUS 1510, 1530. The UE 500 may be statically configured and/or dynamically configured (e.g., by the DRX configuration message 1211) to monitor for WUS outside of DRX ON times. As shown in FIG. 15, a WUS may be sent corresponding to each DRX ON time, here the WUS 1510 corresponding to, and sent/received prior to, the DRX ON time 1520 and the WUS 1530 corresponding to, and sent/received prior to, the DRX ON time 1540. The UE 500, e.g., the PRS measurement and reporting unit 550, may be configured to monitor for the WUS during appropriate WUS monitoring windows 1550, 1560. The WUS 1510, 1530 indicate to the UE 500 whether the UE 500 should implement the corresponding (e.g., next in time) DRX ON times 1520, 1540.

Figure 16:
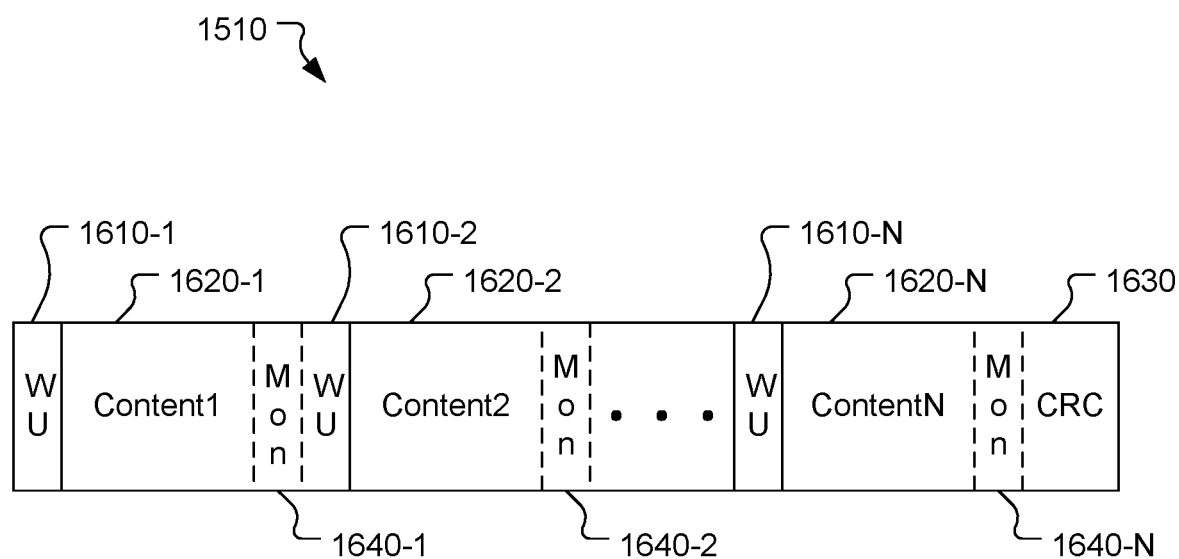
FIG. 16 is a block diagram of one of the wake-up signals shown in FIG. 15.

Referring also to FIG. 16, the WUS 1510 includes wake-up (WU) indications 1610-1, 1610-2, . . . , 1610-N and corresponding content portions 1620-1, 1620-2, . . . , 1620-N, and a cyclic redundancy check (CRC) 1630. Each combination of WU indication and content may correspond to a respective UE 500 such that the WUS 1510 may be shared with multiple UEs 500. The WUS 1510 may be a PDCCH message defined by a DCI format 2_6 with the CRC 1630 scrambled by a PS-RNTI (Power Saving—Radio Network Temporary Identity). Each of the WU indications 1610-1-1610-N may be a single bit indicating to the corresponding UE 500 to implement the corresponding (e.g., next) DRX ON time and thus monitor the PDCCH during the DRX ON time, or to skip (e.g., ignore) the corresponding DRX ON time and thus not monitor the PDCCH during the scheduled DRX ON time. The WUS may be configured only on a primary cell (PCell) or a primary secondary cell group (SCG) cell (PSCell) and may indicate dormancy behavior (to skip DRX ON time) for up to five secondary cell (SCell) groups.

The UE 500, e.g., the PRS measurement and reporting unit 550, may be configured to analyze (e.g., receive, decode, and analyze) the WUS 1510 and respond to the WU indication corresponding to the UE 500, e.g., the WU indication 1610-1, to determine whether and how to measure positioning signals (e.g., PRS (DL-PRS, UL-PRS, SL-PRS)). The UE 500 may be configured (statically and/or dynamically) to adhere to an indication by the WU indication 1610-1 not to skip the DRX ON time, and thus implement the DRX ON time, monitoring the PDCCH and measuring any received A/SP/P PRS, e.g., in accordance with the discussion above regarding FIGS. 6-14. The UE 500 may be configured (statically and/or dynamically) to respond to the WU indication 1610-1 indicating to skip the DRX ON time by not measuring PRS during the corresponding (next) DRX ON time, or by measuring PRS during the DRX ON time without PDCCH monitoring, or by measuring PRS during the DRX ON time with at least limited PDCCH monitoring, e.g., based on an indication included in or associated with the WUS 1510, or based on a configuration of the UE 500. The UE 500 may, if configured to perform multiple ones of these measuring options, select which of these measuring options to perform, e.g., based on desired power usage and power usage of the options, and/or based on one or more desired (or required) position tracking criteria (e.g., accuracy, latency, etc.). The UE 500 may inform a network entity such as the server 400 as to which option the UE 500 will perform such that the network entity can use this information to determine and/or affect a reporting schedule and/or reduce latency. If the UE 500 is statically configured to perform only one of the measuring options, or the UE 500 is dynamically configured by a network entity, through the indication in the WUS 1510, as to which option to perform, then the network entity will have appropriate information to determine and/or affect the reporting schedule and/or reduce latency. The indication may be associated with the WUS 1510 by, for example, explicit reference of the indication to the WUS or vice versa, or the indication being received during a WUS monitoring window 1550.

The UE 500 may be configured (statically and/or dynamically) to measure, without monitoring PDCCH, PRS received during the corresponding DRX ON time for which the WU indicates to skip (monitoring PDCCH during) the DRX ON time, e.g., the DRX ON time 1520 corresponding to the WU indication 1610-1 of the WUS 1510. In this case, the UE 500 can measure periodic PRS, activated semipersistent PRS, or triggered semipersistent PRS as the schedule of such PRS are known by the UE 500 and can be measured without receiving a trigger (e.g., a DCI trigger) over the PDCCH. The UE 500 may, for example, measure the P/SP PRS in accordance with the discussion above regarding FIGS. 6-14.

Figure 17:
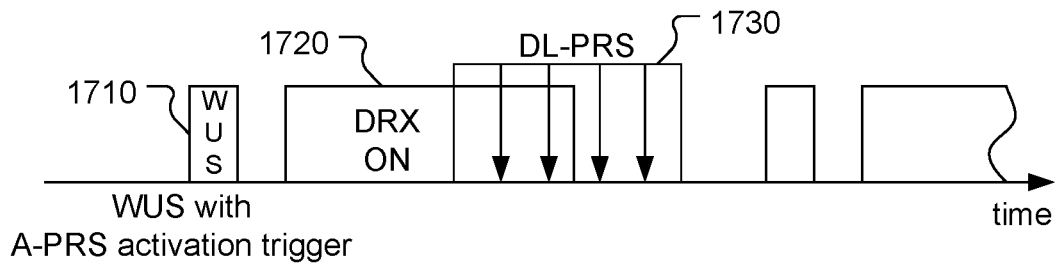
FIG. 17 is a simplified timing diagram of a wake-up signal with an activation trigger, a discontinuous reception mode ON time, and a positioning signal.
Figure 18:
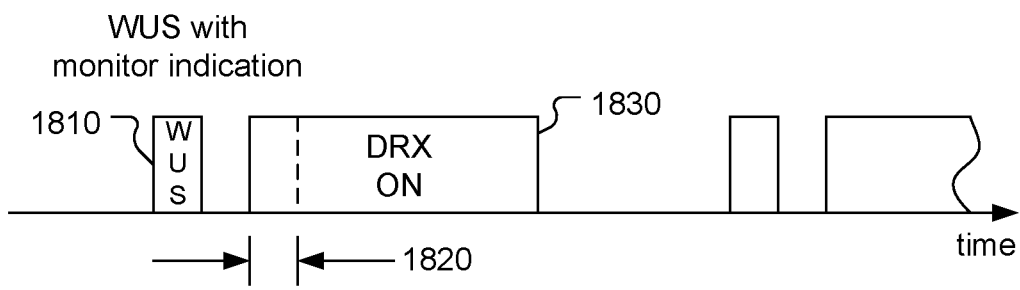
FIG. 18 is a simplified timing diagram of a wake-up signal, with a monitor indication, and a discontinuous reception mode ON time.

The UE 500 may be configured (statically and/or dynamically) to measure PRS received during the corresponding DRX ON time for which the WU indicates to skip the DRX ON time, with at least some monitoring of the PDCCH. For example, the server 400 or the TRP 300 may be configured to have the WUS 1510 include monitor indications 1640-1, 1640-2, . . . , 1640-N and the UE 500 may be configured to respond to a respective one of the monitor indications, e.g., the monitor indication 1640-1, to monitor the PDCCH for at least a portion of the corresponding DRX ON time. For example, referring also to FIG. 17, a WUS 1710 may include (or be associated with) a monitor indication that is an activation field with a value indicating for the UE 500 to activate aperiodic positioning signal detection. This activation field may trigger an aperiodic PRS measurement and corresponding report. The UE 500 may be configured to respond to this indication by activating aperiodic positioning signal detection and measuring an A-DL-PRS 1730 during a DRX ON time 1720, without having to monitor the PDCCH during the DRX ON time 1720. As another example, referring also to FIG. 18, a WUS 1810 may include a monitor indication for the UE 500 to monitor the PDCCH for a limited amount of time and/or limited amount of frequency.

Figure 19:
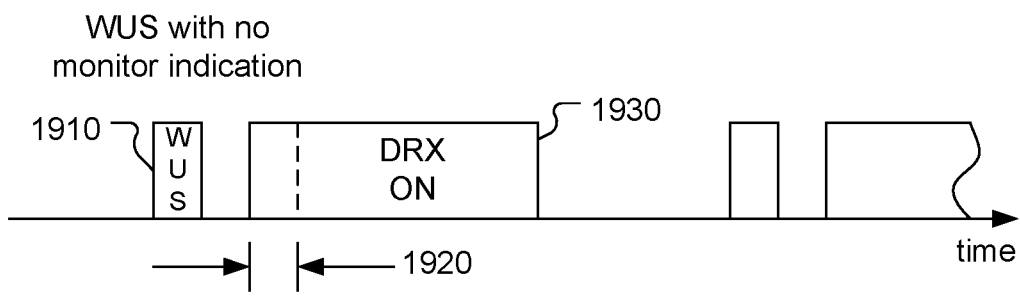
FIG. 19 is a simplified timing diagram of a wake-up signal, without a monitor indication, and a discontinuous reception mode ON time.

The monitor indication may, for example, specify an amount of time and/or an amount of frequency, or may specify to monitor and the UE 500 may be configured to monitor for a preprogrammed amount of time and/or frequency. The limited amount of time (i.e., a monitor time) may, for example, be less than the DRX ON time, e.g., 20% or less of the DRX ON time, 10% or less of the DRX ON time, etc. The limited amount of frequency may be a frequency range (bandwidth) that is less than a bandwidth of the PDCCH, e.g., particular resource blocks (RB s) that in combination (as the RB s may not be consecutive in frequency) comprise 20% or less of the PDCCH bandwidth, 10% or less of the PDCCH bandwidth, etc. In the example shown in FIG. 18, the WUS 1810 includes a monitor indication for the UE 500 to monitor the PDCCH for a monitor window 1820 within a DRX ON time 1830 for detection of instructions (e.g., a DCI message) for measuring a positioning signal. As another example, referring also to FIG. 19, the UE 500 may be configured to monitor the PDCCH for a limited amount of time and/or limited frequency range if the UE 500 is configured for aperiodic positioning signal measurement, e.g., as indicated in an RRC message and regardless of, or in the absence of, the monitor indication (e.g., if the WUS does not include a monitor indication field). In this example, a WUS 1910 includes no monitor indication and the UE 500 monitors the PDCCH for a monitor window 1920 of a DRX ON time 1930 because the UE 500 is configured, e.g., by an RRC message, to monitor the PDCCH. While the monitor windows 1820, 1920 are shown at beginnings of the DRX ON times 1830, 1930, the monitor windows may be other portions of the DRX ON times. By being configured to monitor over a limited time and/or frequency range, aperiodic and/or semipersistent positioning signals may be measured but power saved by not monitoring for aperiodic and/or semipersistent positioning signal commands over the entire DRX ON time. If the UE 500 does not successfully decode a positioning signal measurement trigger during the monitor time, then the UE 500 may discontinue monitoring the PDCCH, saving power that would be consumed turning on a receive chain and/or transmit chain for receiving aperiodic or semipersistent positioning signals.

The UE 500 may be statically and/or dynamically configured whether to report positioning information (e.g., measurement(s), range(s), position estimate(s)) to a network entity such as the TRP 300 and/or the server 400 (e.g., LMF). The UE 500 may be configured not to report positioning information (i.e., not send a positioning report), if the UE 500 skips measurement of a positioning signal in response to the WUS indicating to skip a DRX ON time (skip a DRX cycle). Also or alternatively, the UE 500 may be configured to report positioning information if the UE 500 skips measurement of a positioning signal in response to the WUS indicating to skip a DRX ON time. For example, the UE 500 may send a scheduling request (SR) to a network entity to request an uplink grant to transmit any pending positioning information (e.g., pending measurements) with one or more layer 2/layer 3 reports.

The UE 500 may be configured to implement one or more reporting options for reporting positioning information if the UE 500 measures a positioning signal in response to the WUS indicating to skip a DRX ON time. The UE 500 may be configured to select which of these measuring options to perform, e.g., based on desired power reduction and power usage of the options, and/or based on one or more desired (or required) position tracking criteria (e.g., latency, etc.). The UE 500 may inform a network entity such as the server 400 as to which option the UE 500 will perform such that the network entity can use this information to determine and/or affect a reporting schedule and/or reduce latency. For example, the UE 500 may be configured to send a positioning report in response to measuring an aperiodic positioning signal. As another example, the UE 500 may be configured to report positioning information from measurement(s) of periodic or semipersistent positioning signals. Similar to the discussion above with respect to the table 1100, the UE 500 may be configured not to send a report, based on measurement of periodic or semipersistent positioning signals, over the PUCCH or PUSCH in response to a respective PUCCH mask or PUSCH mask value indicating not to send such report during a DRX ON time, or a respective PUCCH off command or PUSCH off command indicating not to send such report during a DRX OFF time. The mask/off command values may be included in one or more RRC messages. As another example, the UE 500 may be configured to send a positioning report after one or more criteria are met such as a threshold number of measurements being taken, or a report request being received by the UE 500. The UE 500 may wait for the report request in response to the UE 500 suspending reporting either in response to a message received by the UE 500 from a network entity or in response to a determination to suspend reporting made by the UE 500. The UE 500 may determine to suspend reporting based, for example, on a stored energy level of a battery of the UE 500 being below a threshold, and/or based on a time of day, and/or based on a present use of the positioning information not being urgent, etc. The report request may be a trigger from the TRP 300 for the UE 500 to retrieve and report a subset of previous measurements.

Operation—DRX and Positioning Signals with Wake-Up Signal

Figure 20:
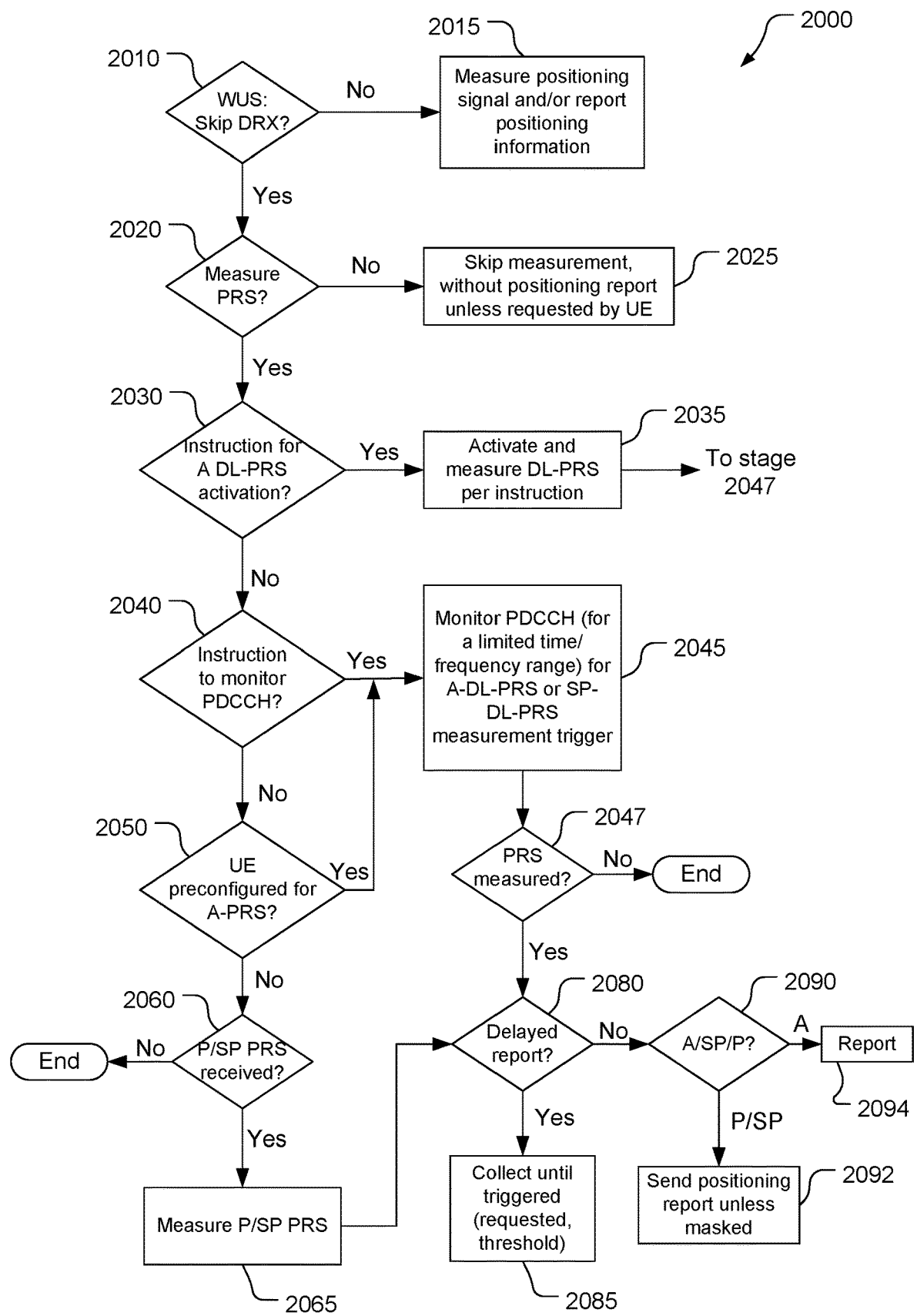
FIG. 20 is a block diagram of an operational flow for measurement of positioning signals.

Referring to FIG. 20, with further reference to FIGS. 1-19, an operational flow 2000 for measurement of positioning signals by the UE 500 and reporting of positioning information by the UE 500 includes the stages shown. The flow 2000 is, however, an example only and not limiting. The flow 2000 may be altered, e.g., by having stages added, removed, rearranged, combined, performed concurrently, and/or having single stages split into multiple stages. One or more stages shown as decision blocks may be indicative of different configuration options and not necessarily a decision being made, e.g., by the processor 510. The flow 2000 may occur after configuration information is received by the UE 500, e.g., after stage 1250 of the flow 1200.

At stage 2010, a WUS is received by the UE 500 and analyzed to determine whether the WUS indicates for the UE 500 to skip a DRX cycle, e.g., whether to skip the nearest in time DRX ON time. For example, the PRS measurement and reporting unit 550 may receive the WUS 1510 from the TRP 300 and analyze the WUS 1510 to determine whether the WU indication corresponding to the UE 500, e.g., the WU indication 1610-1, indicates for the UE 500 to skip the DRX ON time or not. If the WUS indicates not to skip the DRX ON time, then the flow 2000 proceeds to stage 2015 where the UE 500 may implement procedures discussed above with respect to FIGS. 6-14 to measure a positioning signal and/or report positioning information. If the WUS indicates to skip the DRX ON time, then the flow 2000 proceeds to stage 2020.

At stage 2020, if the UE 500 is not to measure a positioning signal, then the flow 2000 proceeds to stage 2025 and if the UE 500 is to measure (or at least attempt to measure) a positioning signal, then the flow 2000 proceeds to stage 2030. At stage 2020, the UE 500 may determine whether the UE 500 will attempt to measure a positioning signal, or the UE 500 may be configured either to attempt to measure a positioning signal or not attempt to measure a positioning signal and thus the UE 500 may make no decision/determination at stage 2020. At stage 2025, the UE 500 skips measuring or attempting to measure a positioning signal, at least for some amount of time such as for and during the scheduled DRX ON time, and may or may not send a positioning report. The UE 500 may be configured, e.g., statically and/or dynamically, not to send a positioning report. Alternatively, the UE 500 may be configured, and/or may determine, to send an SR for a UL grant to transmit pending measurements with L2/L3 reports.

At stage 2030, the UE 500 analyzes the WUS to determine whether an instruction associated with the WUS instructs the UE 500 to activate aperiodic positioning signal measurement, in this example, A-DL-PRS activation by the UE 500. For example, the UE 500 may analyze the WUS 1510 to determine whether the monitor indication 1640-1 instructs A-DL-PRS activation (or other aperiodic positioning signal activation, e.g., A-SL-PRS activation). As another example, the UE 500 may analyze an instruction received during the WUS monitoring window 1550 regarding aperiodic positioning signal measurement activation. If an instruction, such as shown and discussed with respect to FIG. 17, for aperiodic positioning signal measurement activation is received by the UE 500, then the flow 2000 proceeds to stage 2035, or the flow 2000 proceeds to stage 2040 if no instruction for aperiodic positioning signal measurement activation is received by the UE 500. At stage 2035, the UE 500 activates aperiodic positioning signal measurement and attempts to measure a received aperiodic positioning signal, if any. For example, the UE 500 may monitor the PDCCH for instruction for measuring an aperiodic positioning signal and measure such signal. At the end of the DRX ON time, or any excess time for completing a positioning signal measurement, the flow proceeds to stage 2047.

At stage 2040, the UE 500 analyzes the WUS to determine whether an instruction associated with the WUS instructs the UE 500 to monitor the PDCCH. For example, the UE 500 may analyze the WUS, or a message (e.g., a DCI) message received during the WUS monitoring window 1550, for an instruction such as any of the instructions discussed above with respect to FIG. 18 to monitor the PDCCH for a limited amount of time and/or a limited frequency range. If such an instruction is associated with the WUS (e.g., in the WUS or received during the WUS monitoring window 1550), then the flow 2000 proceeds to stage 2045 and if no such instruction is received, then the flow 2000 proceeds to stage 2050. At stage 2045, the UE 500 monitors the PDCCH for the limited time and/or over the limited frequency range, measures any aperiodic or semipersistent positioning signal received, and then proceeds to stage 2047. At stage 2047, if a positioning signal was not measured at stage 2045 or stage 2035, then the flow 2000 ends, and if a positioning signal was measured at stage 2045 or stage 2035, then the flow proceeds to stage 2080. At stage 2050, with no instruction to monitor the PDCCH being associated with the WUS, if the UE 500 is preconfigured (e.g., by the PRS measurement configuration message 1241, e.g., by one or more RRC messages) to measure aperiodic positioning signals, then the flow proceeds to stage 2045 for measurement of aperiodic positioning signals, and if not, then the flow proceeds to stage 2060.

At stage 2060, a periodic or semipersistent positioning signal may be received. If no such signal is received, then the flow 2000 ends. If a periodic or semipersistent signal is received, then the flow 2000 proceeds to stage 2065 where the positioning signal is measured, e.g., in accordance with the table 900. The flow 2000 then proceeds to stage 2080.

At stage 2080, the UE 500 may or may not delay reporting of positioning information. If reporting of the positioning information is not conditional, then the flow 2000 proceeds to stage 2090 and if the reporting of the positioning information is conditional, then the flow 2000 proceeds to stage 2085. At stage 2085, the UE 500 monitors one or more conditions (e.g., a measurement counter, receipt of a request to report such as the grant message 1282) and reports the positioning information once the one or more conditions are met (e.g., counter exceeds a threshold quantity of measurements).

At stage 2090, the reporting of the positioning information may depend upon the type of positioning signal measured. For positioning information corresponding to measurement of a periodic or semipersistent positioning signal, the flow 2000 proceeds to stage 2092 where the positioning information is reported unless a mask/off command indicates not to report the positioning information, in which case the UE 500 inhibits reporting the information, e.g., ignores or otherwise prevents transmission of the positioning information to an entity outside the UE 500. For positioning information corresponding to an aperiodic positioning signal, the flow 2000 proceeds to stage 2094 where the positioning information is reported.

Figure 21:
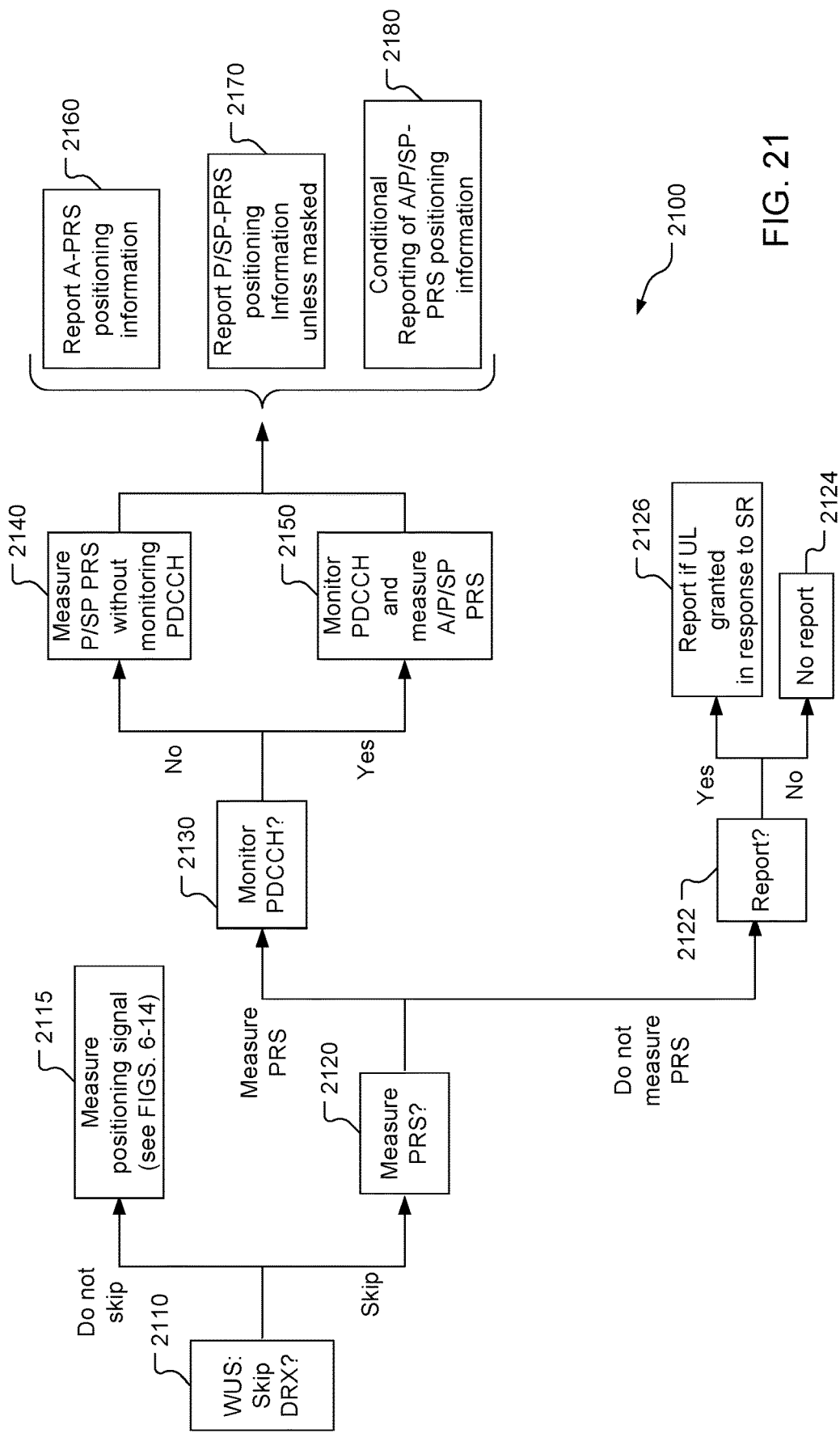
FIG. 21 is an operational summary of the flow shown in FIG. 20.

Referring also to FIG. 21, an operational summary 2100 of the flow 2000 includes the stages shown. As with the flow 2000, some stages in the operational summary 2100 indicated as decisions may not involve a decision being made by the UE 500 or other entity. At stage 2110, like stage 2010, the UE 500 determines whether the WUS indicates to skip a DRX ON time, e.g., the next DRX ON time. If not, then similar to stage 2015, at stage 2115 the UE 500 may measure positioning signals as discussed with respect to FIGS. 6-14. If the DRX ON time is to be skipped, then at stage 2120 (similar to stage 2020), if PRS are not to be measured, then at stage 2122 if positioning information is not to be reported, then at stage 2124 no report is sent and otherwise at stage 2126 the positioning information is reported in response to a UL grant in response to an SR sent by the UE 500. If PRS is to be measured, then at stage 2130 (similar to stages 2030, 2040, 2050) if the PDCCH is not to be monitored the P/SP PRS may be measured (without monitoring PDCCH) at stage 2140 (similar to stage 2065) and if the PDCCH is to be monitored then at stage 2150 (similar to stages 2035, 2045) the PDCCH is monitored and A/P/SP PRS may be measured. At stage 2160 (similar to stage 2094), positioning information corresponding to aperiodic PRS may be reported. At stage 2170 (similar to stage 2092) positioning information corresponding to P/SP PRS may be reported unless a mask/off command indicates not to report such information. At stage 2180 (similar to stage 2085) positioning information corresponding to A/P/SP PRS may be conditionally reported.

Figure 22:
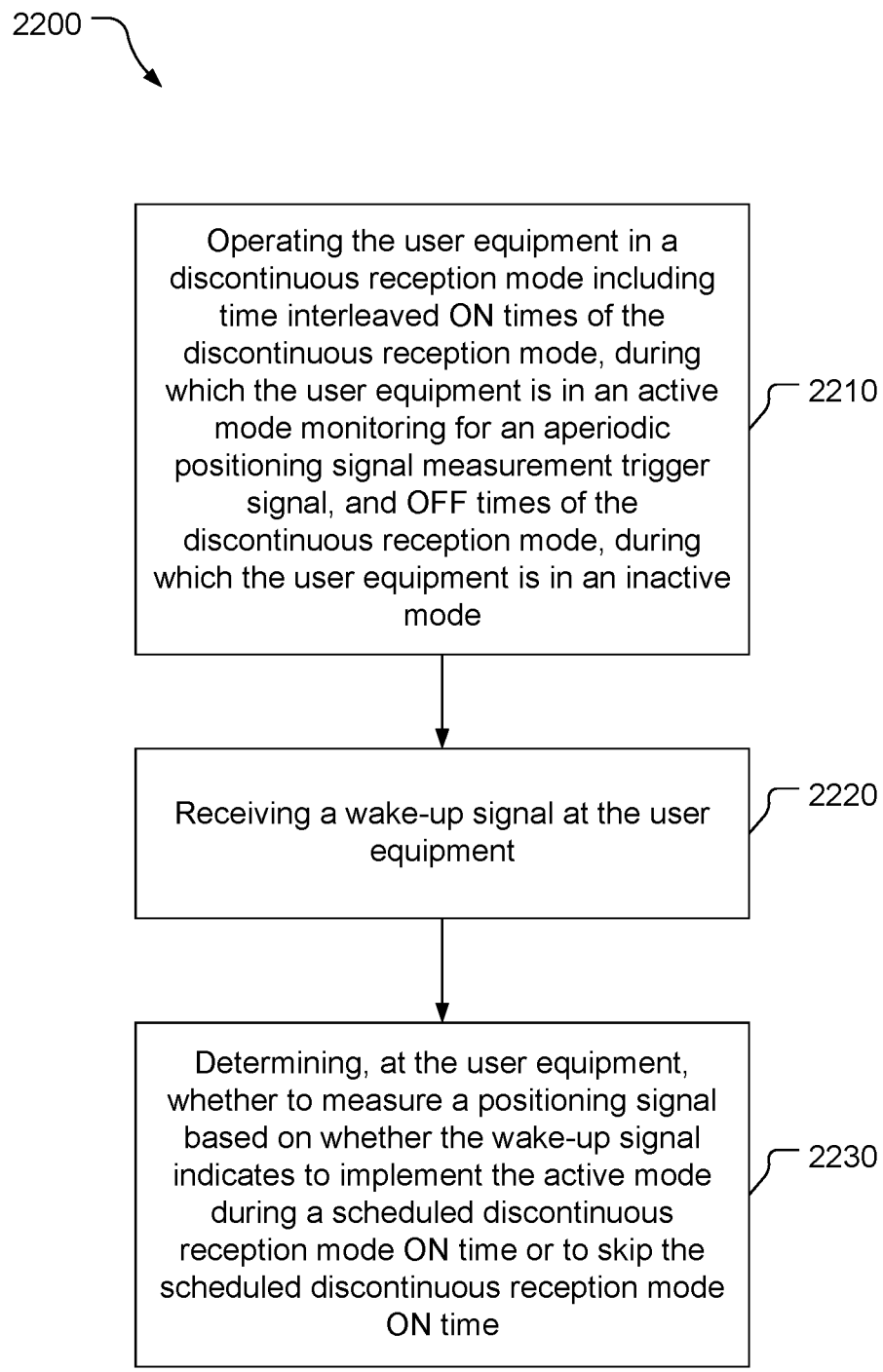
FIG. 22 is a block flow diagram of a positioning signal processing method at a user equipment.

Referring to FIG. 22, with further reference to FIGS. 1-21, a positioning signal processing method 2200 at a UE includes the stages shown. The method 2200 is, however, an example only and not limiting. The method 2200 may be altered, e.g., by having stages added, removed, rearranged, combined, performed concurrently, and/or having single stages split into multiple stages.

At stage 2210, the method 2200 includes operating the user equipment in a discontinuous reception mode including time interleaved ON times of the discontinuous reception mode, during which the user equipment is in an active mode monitoring for a positioning signal measurement trigger signal, and OFF times of the discontinuous reception mode, during which the user equipment is in an inactive mode. For example, the UE 500 cycles through DRX active and inactive modes in accordance with parameters provided to the UE 500 in the DRX configuration message 1211 from the TRP 300 (the serving TRP for the UE 500). The UE 500 alternates between periods of monitoring the PDCCH and periods of not monitoring the PDCCH. The processor 510, in combination with the interface 520 (e.g., the wireless receiver 244 and the antenna 246) and possibly in combination with the memory 530 (e.g., the software 212), may comprise means for operating in a discontinuous reception mode.

At stage 2220, the method 2200 includes receiving a wake-up signal at the user equipment. For example, the UE 500 receives the WUS 1510 from the TRP 300 with or without the direction of the server 400. The processor 510, in combination with the interface 520 (e.g., the wireless receiver 244 and the antenna 246) and possibly in combination with the memory 530 (e.g., the software 212), may comprise means for receiving a wake-up signal.

At stage 2230, the method 2200 includes determining, at the user equipment, whether to measure a positioning signal based on whether the wake-up signal indicates to implement the active mode during a scheduled discontinuous reception mode ON time or to skip the scheduled discontinuous reception mode ON time. For example, the UE 500 may decode and analyze the WUS 1510 to determine whether the WU indication 1610-1 indicates for the UE 500 to skip the next DRX ON time and thus remain in the inactive mode during the scheduled DRX ON time. In the inactive mode, the UE 500 will not monitor for a trigger (e.g., an aperiodic signal) for measuring an aperiodic or semipersistent positioning signal, e.g., not monitor the PDCCH for a DCI trigger to measure A-DL-PRS or SP-DL-PRS. The processor 510, possibly in combination with the memory 530 (e.g., the software 212), may comprise means for determining whether to measure a positioning signal.

Implementations of the method 2200 may include one or more of the following features. In an example implementation, the method 2200 may include measuring the positioning signal, in response to the wake-up signal indicating to skip the scheduled discontinuous reception mode ON time, without monitoring for the positioning signal measurement trigger signal (e.g., an aperiodic signal to trigger aperiodic PRS or semipersistent PRS). The UE 500 may respond, due to being statically and/or dynamically configured to do so, to the WUS 1510 indicating to skip the DRX ON time by measuring one or more periodic or semipersistent positioning signals, e.g., as shown at stages 2065 and 2140. The processor 510, in combination with the interface 520 (e.g., the wireless receiver 244 and the antenna 246) and possibly in combination with the memory 530 (e.g., the software 212), may comprise means for measuring the positioning signal.

Also or alternatively, implementations of the method 2200 may include one or more of the following features. In an example implementation, the method 2200 may include monitoring for the positioning signal measurement trigger signal in response to the wake-up signal indicating to skip the scheduled discontinuous reception mode ON time. For example, the PRS measurement and reporting unit 550 may respond to the WU indication 1610-1 indicating to skip the DRX ON time by monitoring the PDCCH for a DCI to measure an aperiodic or semipersistent positioning signal, e.g., as discussed with respect to stages 2035, 2045, 2150. The processor 510, in combination with the interface 520

(e.g., the wireless receiver 244 and the antenna 246) and possibly in combination with the memory 530 (e.g., the software 212), may comprise means for monitoring for the positioning signal measurement trigger signal. In another example implementation, the UE 500 may monitor for the positioning signal measurement trigger signal for a monitor duration that is less than the discontinuous reception mode ON time. For example, the UE 500 may monitor the PDCCH for the monitor window 1820, 1920 that is shorter than the DRX ON time 1830, 1930, which may save energy compared to monitoring the PDCCH for the entire DRX ON time while enabling triggering of aperiodic positioning signal measurement. In another example implementation, monitoring for the positioning signal measurement trigger signal may comprise monitoring a control channel for the positioning signal measurement trigger signal over a limited frequency range that is less than a bandwidth of the control channel. For example, the UE 500 may monitor less than all of the bandwidth of the PDCCH for a DCI trigger to measure an aperiodic PRS, and may do so for the entire DRX ON time or for less than the entire DRX ON time. This may save power compared to monitoring the entire bandwidth of the PDCCH while enabling triggering of aperiodic positioning signal measurement. In another example implementation, monitoring for the positioning signal measurement trigger signal may also be in response to receipt of an instruction from a network entity to monitor for the positioning signal measurement trigger signal. For example, the UE 500 may monitor the PDCCH during the WUS monitor window 1550 and receive an instruction, e.g., a DCI in an RRC message or an instruction in the WUS 1510, to monitor the PDCCH for a trigger to measure A/SP PRS. Without receiving the instruction, the UE 500 may not monitor the PDCCH during the scheduled DRX ON time for the A/SP PRS trigger.

Also or alternatively, implementations of the method 2200 may include one or more of the following features. In an example implementation, the method 2200 may include: measuring the positioning signal in response to the wake-up signal indicating to skip the scheduled discontinuous reception mode ON time; and transmitting an aperiodic positioning information report in response to measurement of the positioning signal, where the positioning signal is an aperiodic positioning signal. For example, the PRS measurement and reporting unit 550 may report positioning information resulting from measurement of one or more aperiodic positioning signals in an aperiodic positioning report as discussed with respect to stages 2094, 2160. The processor 510, in combination with the interface 520 (e.g., the wireless receiver 244 and the antenna 246) and possibly in combination with the memory 530 (e.g., the software 212), may comprise means for measuring the positioning signal and the processor 510, in combination with the interface 520 (e.g., the wireless transmitter 242 and the antenna 246) and possibly in combination with the memory 530 (e.g., the software 212), may comprise means for transmitting the aperiodic positioning information report.

Also or alternatively, implementations of the method 2200 may include one or more of the following features. In an example implementation, the method 2200 may include: measuring the positioning signal in response to the wake-up signal indicating to skip the scheduled discontinuous reception mode ON time; and either: transmitting a positioning report of positioning information based on measuring the positioning signal; or inhibiting transmitting of the positioning report in response to receiving a report-inhibiting instruction at the user equipment from a network entity. For example, the PRS measurement and reporting unit 550 may measure one or more positioning signals in response to the WU indication 1610-1 indicating to skip the DRX ON time and report positioning information based on measurement of one or more P/SP-PRS unless a mask/off command has been received by the UE 500 indicating not to report some positioning information, e.g., as discussed with respect to stages 2092, 2170. The processor 510, in combination with the interface 520 (e.g., the wireless transmitter 242 and the antenna 246) and possibly in combination with the memory 530 (e.g., the software 212), may comprise means for transmitting the positioning report. The processor 510, possibly in combination with the memory 530, may comprise means for inhibiting transmitting of the positioning report.

Also or alternatively, implementations of the method 2200 may include one or more of the following features. In an example implementation, the method 2200 may include: measuring the positioning signal in response to the wake-up signal indicating to skip the scheduled discontinuous reception mode ON time; and transmitting a positioning report of positioning information based on measuring the positioning signal and in response to at least one of measuring a threshold number of positioning reference signal resources or receiving a report request at the user equipment from a network entity. For example, the PRS measurement and reporting unit 550 may measure one or more positioning signals in response to the WU indication 1610-1 indicating to skip the DRX ON time and report positioning information based on one or more criteria being met such as a threshold number of PRS measurements being taken or a report request being received (e.g., after halting of reporting by the UE 500), e.g., as discussed with respect to stages 2085, 2180. The processor 510, in combination with the interface 520 (e.g., the wireless receiver 244 and the antenna 246) and possibly in combination with the memory 530 (e.g., the software 212), may comprise means for measuring the positioning signal and the processor 510, in combination with the interface 520 (e.g., the wireless transmitter 242 and the antenna 246) and possibly in combination with the memory 530 (e.g., the software 212), may comprise means for transmitting the positioning report.

Also or alternatively, implementations of the method 2200 may include one or more of the following features. In an example implementation, the method 2200 may include inhibiting measurement of the positioning signal in response to the wake-up signal indicating to skip the scheduled discontinuous reception mode ON time. The PRS measurement and reporting unit 550 may, for example, respond to the WU indication 1610-1 indicating to skip the DRX ON time by ignoring incoming positioning signals or actively preventing measurement of the incoming positioning signals (e.g., by turning off a receive RF chain for decoding the incoming signals). The processor 510, in combination with the interface 520 (e.g., the wireless receiver 244 and the antenna 246) and possibly in combination with the memory 530 (e.g., the software 212), may comprise means for inhibiting measurement of the positioning signal. In another example implementation, the method 2200 may include measuring the positioning signal in response to the wake-up signal indicating to implement the active mode during the scheduled discontinuous reception mode ON time. For example, the PRS measurement and reporting unit 550 may measure one or more positioning signals as if no WUS was received or analyzed, e.g., as discussed with respect to stages 2015, 2115. The processor 510, in combination with the interface 520 (e.g., the wireless receiver 244 and the antenna 246) and possibly in combination with the memory

530 (e.g., the software 212), may comprise means for measuring the positioning signal.

Figure 23:
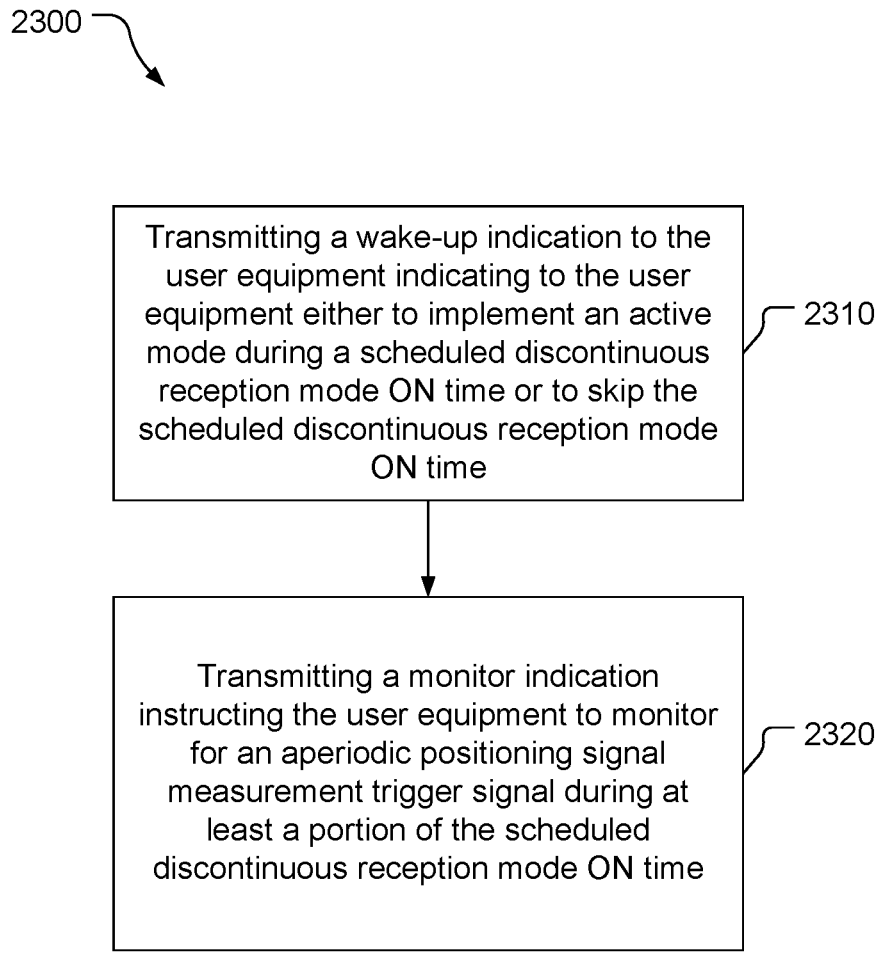
FIG. 23 is a block flow diagram of a method of transmitting positioning instructions to a user equipment.

Referring to FIG. 23, with further reference to FIGS. 1-21, a method 2300 of transmitting positioning instructions to a UE includes the stages shown. The method 2300 is, however, an example only and not limiting. The method 2300 may be altered, e.g., by having stages added, removed, rearranged, combined, performed concurrently, and/or having single stages split into multiple stages.

At stage 2310, the method 2300 includes transmitting a wake-up indication to the user equipment indicating to the user equipment either to implement an active mode during a scheduled discontinuous reception mode ON time or to skip the scheduled discontinuous reception mode ON time. For example, the TRP 300 transmits the WUS 1510 to the UE 500, with or without the direction of the server 400, or the server 400 could transmit the WUS 1510 to the UE 500. The WUS 1510 contains the WU indications, each corresponding to a respective UE, to indicate to the UEs whether to skip a DRX ON time. The processor 310, in combination with the transceiver 315 (e.g., the wireless transmitter 342 and the antenna 346) and possibly in combination with the memory 311 (e.g., the software 312), may comprise means for transmitting a wake-up indication. Also or alternatively, the processor 410, in combination with the transceiver 415 (e.g., the wireless transmitter 442 and the antenna 446) and possibly in combination with the memory 411 (e.g., the software 412), may comprise means for transmitting a wake-up indication.

At stage 2320, the method 2300 includes transmitting a monitor indication instructing the user equipment to monitor for a positioning signal measurement trigger signal during at least a portion of the scheduled discontinuous reception mode ON time. For example, the TRP 300 or the server 400 may transmit an indication for the UE 500 to monitor the PDCCH for at least part of the scheduled DRX ON time. The processor 310, in combination with the transceiver 315 (e.g., the wireless transmitter 342 and the antenna 346) and possibly in combination with the memory 311 (e.g., the software 312), may comprise means for transmitting a monitor indication. Also or alternatively, the processor 410, in combination with the transceiver 415 (e.g., the wireless transmitter 442 and the antenna 446) and possibly in combination with the memory 411 (e.g., the software 412), may comprise means for transmitting a monitor indication. The monitor indication may be associated with the wake-up indication, e.g., being part of a wake-up signal that includes the wake-up indication, or being separate from the wake-up signal but received by the UE 500 within the WUS monitoring window 1550.

Implementations of the method 2300 may include one or more of the following features. In an example implementation, the monitor indication may include a time indication indicating for the user equipment to monitor for the positioning signal measurement trigger signal (e.g., an aperiodic signal to trigger aperiodic PRS or semipersistent PRS) for a monitor-duration portion of the scheduled discontinuous reception mode ON time that is less than the scheduled discontinuous reception mode ON time. The monitor indication 1640-1, for example, may specify an amount of time for the UE 500 to monitor the PDCCH during a scheduled DRX ON time, or may include a coded indication, e.g., a single bit to indicate to monitor the PDCCH for a preprogrammed (in the UE 500) amount of time. In another example implementation, the monitor indication may include a frequency indication indicating for the user equipment to monitor a downlink channel for the positioning signal measurement trigger signal during the at least a portion of the scheduled discontinuous reception mode ON time for a monitor-frequency bandwidth that is less than a channel bandwidth of the downlink channel. The monitor indication 1640-1, for example, may specify a frequency range within a bandwidth of the PDCCH for the UE 500 to monitor during a scheduled DRX ON time (e.g., all or a portion of the DRX ON time), or may include a coded indication of the frequency range. The monitor indication may thus indicate particular monitoring occasions with specified time and/or specified frequency range. In another example implementation, the monitor indication may include an activation instruction for the user equipment to activate downlink positioning signal monitoring. For example, an indication associated with the WUS 1510 may cause the UE 500 to activate A-DL-PRS monitoring to cause the UE 500 to monitor and measure aperiodic PRS. In another example implementation, the wake-up indication and the monitor indication are transmitted as separate parts of a wake-up signal that also includes a content field that is separate from the wake-up indication and separate from the monitor indication. The monitor indication 1640-1, for example, may be separate from the wake-up indication 1610-1 and the content portion 1620-1.

Implementation Examples

Implementation examples are provided in the following numbered clauses.

Clause 1. A non-transitory, processor-readable storage medium comprising processor-readable instructions configured to cause a processor of a user equipment to:
  operate the user equipment in a discontinuous reception mode including time interleaved ON times of the discontinuous reception mode and OFF times of the discontinuous reception mode; and
  determine whether to measure a portion of a positioning signal based on timing of the portion of the positioning signal relative to at least one of a first one of the ON times of the discontinuous reception mode or a first one of the OFF times of the discontinuous reception mode.

Clause 2. The storage medium of clause 1, further comprising processor-readable instructions configured to cause the processor to at least one of:
  measure all of the portion of the positioning signal in response to a first part of the portion of the positioning signal being scheduled to arrive during the first one of the ON times and a second part of the portion of the positioning signal being scheduled to arrive during the first one of the OFF times; or
  measure a third part of the portion of the positioning signal in response to the first part of the portion of the positioning signal being scheduled to arrive during the first one of the ON times and the second part of the portion of the positioning signal being scheduled to arrive during the first one of the OFF times, the third part of the positioning signal being less than the portion of the positioning signal; or
  inhibit measuring any of the portion of the positioning signal in response to the first part of the portion of the positioning signal being scheduled to arrive during the first one of the ON times and the second part of the portion of the positioning signal being scheduled to arrive during the first one of the OFF times.

Clause 3. The storage medium of clause 2, further comprising processor-readable instructions configured to cause the processor to:

receive configuration information at the user equipment; and determine, based on the configuration information, whether to measure all of the portion of the positioning signal, or measure the third part of the portion of the positioning signal, or inhibit measuring any of the portion of the positioning signal, in response to the first part of the portion of the positioning signal being scheduled to arrive during the first one of the ON times and the second part of the portion of the positioning signal being scheduled to arrive during the first one of the OFF times.

Clause 4. The storage medium of clause 1, further comprising processor-readable instructions configured to cause the processor to:

measure a third part of the portion of the positioning signal in response to a first part of the portion of the positioning signal being scheduled to arrive during the first one of the ON times and a second part of the portion of the positioning signal being scheduled to arrive during the first one of the OFF times, the third part of the positioning signal being less than the portion of the positioning signal; and determine the third part of the portion of the positioning signal at least one of:
based on at least one of a resource set, a frequency layer, a number of sources of the portion of the positioning signal, or a repetition factor of the positioning signal; or
as the first part of the portion of the positioning signal.

Clause 5. The storage medium of clause 1, further comprising processor-readable instructions configured to cause the processor to measure all of the portion of the positioning signal in response to all of the positioning signal being scheduled to arrive in the first one of the ON times of the discontinuous reception mode.

Clause 6. The storage medium of clause 1, further comprising processor-readable instructions configured to cause the processor to at least one of:

measure all of the portion of the positioning signal in response to all of the positioning signal being scheduled to arrive in the first one of the OFF times of the discontinuous reception mode; or inhibit measuring any of the portion of the positioning signal in response to all of the positioning signal being scheduled to arrive in the first one of the OFF times of the discontinuous reception mode.

Clause 7. The storage medium of clause 1, further comprising processor-readable instructions configured to cause the processor to:

receive configuration information at the user equipment; and respond to the configuration information by either measuring all of the portion of the positioning signal, or inhibiting measuring any of the portion of the positioning signal, in response to all of the positioning signal being scheduled to arrive in the first one of the OFF times of the discontinuous reception mode.

Clause 8. The storage medium of clause 1, further comprising processor-readable instructions configured to cause the processor to transmit a scheduling request to a network entity for an uplink grant to transmit a positioning report above layer 1 and layer 2.

Clause 9. The storage medium of clause 1, further comprising processor-readable instructions configured to cause the processor to:

transmit a positioning report at least one of asynchronously, semi-persistently, or periodically; and at least one of:
inhibit transmitting of the positioning report during a second one of the ON times of the discontinuous reception mode based on an uplink report flag being received from a network entity; or
inhibit transmitting of the positioning report based on the uplink report flag being received from the network entity, and the positioning report being semi-persistent or periodic and being scheduled to be sent during a second one of the OFF times of the discontinuous reception mode.

Clause 10. A network entity comprising:
a transceiver;
a memory; and
a processor communicatively coupled to the transceiver and the memory, wherein the processor is configured to transmit configuration information to a user equipment (UE) via the transceiver, the configuration information configured to cause the UE to determine whether to measure a portion of a positioning signal based on timing of the portion of the positioning signal relative to at least one of an ON time of a discontinuous reception mode of the UE or an OFF time of the discontinuous reception mode.

Clause 11. The network entity of clause 10, wherein the configuration information is configured to cause the UE to at least one of:

measure all of the portion of the positioning signal in response to a first part of the portion of the positioning signal being scheduled to arrive during the ON time and a second part of the portion of the positioning signal being scheduled to arrive during the OFF time; or measure a third part of the portion of the positioning signal in response to the first part of the portion of the positioning signal being scheduled to arrive during the ON time and the second part of the portion of the positioning signal being scheduled to arrive during the OFF time, the third part of the positioning signal being less than the portion of the positioning signal; or inhibit measuring any of the portion of the positioning signal in response to the first part of the portion of the positioning signal being scheduled to arrive during the ON time and the second part of the portion of the positioning signal being scheduled to arrive during the OFF time.

Clause 12. The network entity of clause 11, wherein the configuration information is configured to cause the UE to measure all of the portion of the positioning signal, or measure the third part of the portion of the positioning signal, or inhibit measuring any of the portion of the positioning signal, in response to the first part of the portion of the positioning signal being scheduled to arrive during the ON time and the second part of the portion of the positioning signal being scheduled to arrive during the OFF time.

Clause 13. The network entity of clause 10, wherein the configuration information is configured to cause the UE to:

measure a third part of the portion of the positioning signal in response to a first part of the portion of the positioning signal being scheduled to arrive during the ON time and a second part of the portion of the positioning signal being scheduled to arrive during the OFF time, the third part of the positioning signal being less than the portion of the positioning signal; and determine the third part of the portion of the positioning signal at least one of:
- based on at least one of a resource set, a frequency layer, a number of sources of the portion of the positioning signal, or a repetition factor of the positioning signal; or
- as the first part of the portion of the positioning signal.

Clause 14. The network entity of clause 10, wherein the configuration information is configured to cause the UE to measure all of the portion of the positioning signal in response to all of the positioning signal being scheduled to arrive in the ON time of the discontinuous reception mode.

Clause 15. The network entity of clause 10, wherein the configuration information is configured to cause the UE to either:
- measure all of the portion of the positioning signal in response to all of the positioning signal being scheduled to arrive in the OFF time of the discontinuous reception mode; or
- inhibit measuring any of the portion of the positioning signal in response to all of the positioning signal being scheduled to arrive in the OFF time of the discontinuous reception mode.

Clause 16. The network entity of clause 10, wherein the configuration information is configured to cause the UE to:
- transmit a positioning report at least one of semi-persistently or periodically; and
- inhibit transmitting of the positioning report based on an uplink report flag in the configuration information.

Clause 17. A network entity comprising:
- a transceiver; and
- means for transmitting configuration information to a user equipment (UE) via the transceiver, the configuration information configured to cause the UE to determine whether to measure a portion of a positioning signal based on timing of the portion of the positioning signal relative to at least one of an ON time of a discontinuous reception mode of the UE or an OFF time of the discontinuous reception mode.

Clause 18. The network entity of clause 17, wherein the configuration information is configured to cause the UE to at least one of:
- measure all of the portion of the positioning signal in response to a first part of the portion of the positioning signal being scheduled to arrive during the ON time and a second part of the portion of the positioning signal being scheduled to arrive during the OFF time; or
- measure a third part of the portion of the positioning signal in response to the first part of the portion of the positioning signal being scheduled to arrive during the ON time and the second part of the portion of the positioning signal being scheduled to arrive during the OFF time, the third part of the positioning signal being less than the portion of the positioning signal; or
- inhibit measuring any of the portion of the positioning signal in response to the first part of the portion of the positioning signal being scheduled to arrive during the ON time and the second part of the portion of the positioning signal being scheduled to arrive during the OFF time.

Clause 19. The network entity of clause 18, wherein the configuration information is configured to cause the UE to measure all of the portion of the positioning signal, or measure the third part of the portion of the positioning signal, or inhibit measuring any of the portion of the positioning signal, in response to the first part of the portion of the positioning signal being scheduled to arrive during the ON time and the second part of the portion of the positioning signal being scheduled to arrive during the OFF time.

Clause 20. The network entity of clause 17, wherein the configuration information is configured to cause the UE to:
- measure a third part of the portion of the positioning signal in response to a first part of the portion of the positioning signal being scheduled to arrive during the ON time and a second part of the portion of the positioning signal being scheduled to arrive during the OFF time, the third part of the positioning signal being less than the portion of the positioning signal; and
- determine the third part of the portion of the positioning signal at least one of:
  - based on at least one of a resource set, a frequency layer, a number of sources of the portion of the positioning signal, or a repetition factor of the positioning signal; or
  - as the first part of the portion of the positioning signal.

Clause 21. The network entity of clause 17, wherein the configuration information is configured to cause the UE to measure all of the portion of the positioning signal in response to all of the positioning signal being scheduled to arrive in the ON time of the discontinuous reception mode.

Clause 22. The network entity of clause 17, wherein the configuration information is configured to cause the UE to either:
- measure all of the portion of the positioning signal in response to all of the positioning signal being scheduled to arrive in the OFF time of the discontinuous reception mode; or
- inhibit measuring any of the portion of the positioning signal in response to all of the positioning signal being scheduled to arrive in the OFF time of the discontinuous reception mode.

Clause 23. The network entity of clause 17, wherein the configuration information is configured to cause the UE to:
- transmit a positioning report at least one of semi-persistently or periodically; and
- inhibit transmitting of the positioning report based on an uplink report flag in the configuration information.

Clause 24. A method of configuring a user equipment (UE), the method comprising:
- transmitting configuration information to the UE, the configuration information configured to cause the UE to determine whether to measure a portion of a positioning signal based on timing of the portion of the positioning signal relative to at least one of an ON time of a discontinuous reception mode of the UE or an OFF time of the discontinuous reception mode.

Clause 25. The method of clause 24, wherein the configuration information is configured to cause the UE to at least one of:
- measure all of the portion of the positioning signal in response to a first part of the portion of the positioning signal being scheduled to arrive during the ON time and a second part of the portion of the positioning signal being scheduled to arrive during the OFF time; or
- measure a third part of the portion of the positioning signal in response to the first part of the portion of the positioning signal being scheduled to arrive during the ON time and the second part of the portion of the positioning signal being scheduled to arrive during the OFF time, the third part of the positioning signal being less than the portion of the positioning signal; or inhibit measuring any of the portion of the positioning signal in response to the first part of the portion of the positioning signal being scheduled to arrive during the ON time and the second part of the portion of the positioning signal being scheduled to arrive during the OFF time.

Clause 26. The method of clause 25, wherein the configuration information is configured to cause the UE to measure all of the portion of the positioning signal, or measure the third part of the portion of the positioning signal, or inhibit measuring any of the portion of the positioning signal, in response to the first part of the portion of the positioning signal being scheduled to arrive during the ON time and the second part of the portion of the positioning signal being scheduled to arrive during the OFF time.

Clause 27. The method of clause 24, wherein the configuration information is configured to cause the UE to:
measure a third part of the portion of the positioning signal in response to a first part of the portion of the positioning signal being scheduled to arrive during the ON time and a second part of the portion of the positioning signal being scheduled to arrive during the OFF time, the third part of the positioning signal being less than the portion of the positioning signal; and
determine the third part of the portion of the positioning signal at least one of:
based on at least one of a resource set, a frequency layer, a number of sources of the portion of the positioning signal, or a repetition factor of the positioning signal; or
as the first part of the portion of the positioning signal.

Clause 28. The method of clause 24, wherein the configuration information is configured to cause the UE to measure all of the portion of the positioning signal in response to all of the positioning signal being scheduled to arrive in the ON time of the discontinuous reception mode.

Clause 29. The method of clause 24, wherein the configuration information is configured to cause the UE to either:
measure all of the portion of the positioning signal in response to all of the positioning signal being scheduled to arrive in the OFF time of the discontinuous reception mode; or
inhibit measuring any of the portion of the positioning signal in response to all of the positioning signal being scheduled to arrive in the OFF time of the discontinuous reception mode.

Clause 30. The method of clause 24, wherein the configuration information is configured to cause the UE to:
transmit a positioning report at least one of semi-persistently or periodically; and
inhibit transmitting of the positioning report based on an uplink report flag in the configuration information.

Clause 31. A non-transitory, processor-readable storage medium comprising processor-readable instructions configured to cause a processor of a network entity to:
transmit configuration information to a user equipment (UE), the configuration information configured to cause the UE to determine whether to measure a portion of a positioning signal based on timing of the portion of the positioning signal relative to at least one of an ON time of a discontinuous reception mode of the UE or an OFF time of the discontinuous reception mode.

Clause 32. The storage medium of clause 31, wherein the configuration information is configured to cause the UE to at least one of:
measure all of the portion of the positioning signal in response to a first part of the portion of the positioning signal being scheduled to arrive during the ON time and a second part of the portion of the positioning signal being scheduled to arrive during the OFF time; or
measure a third part of the portion of the positioning signal in response to the first part of the portion of the positioning signal being scheduled to arrive during the ON time and the second part of the portion of the positioning signal being scheduled to arrive during the OFF time, the third part of the positioning signal being less than the portion of the positioning signal; or
inhibit measuring any of the portion of the positioning signal in response to the first part of the portion of the positioning signal being scheduled to arrive during the ON time and the second part of the portion of the positioning signal being scheduled to arrive during the OFF time.

Clause 33. The storage medium of clause 32, wherein the configuration information is configured to cause the UE to measure all of the portion of the positioning signal, or measure the third part of the portion of the positioning signal, or inhibit measuring any of the portion of the positioning signal, in response to the first part of the portion of the positioning signal being scheduled to arrive during the ON time and the second part of the portion of the positioning signal being scheduled to arrive during the OFF time.

Clause 34. The storage medium of clause 31, wherein the configuration information is configured to cause the UE to:
measure a third part of the portion of the positioning signal in response to a first part of the portion of the positioning signal being scheduled to arrive during the ON time and a second part of the portion of the positioning signal being scheduled to arrive during the OFF time, the third part of the positioning signal being less than the portion of the positioning signal; and
determine the third part of the portion of the positioning signal at least one of:
based on at least one of a resource set, a frequency layer, a number of sources of the portion of the positioning signal, or a repetition factor of the positioning signal; or
as the first part of the portion of the positioning signal.

Clause 35. The storage medium of clause 31, wherein the configuration information is configured to cause the UE to measure all of the portion of the positioning signal in response to all of the positioning signal being scheduled to arrive in the ON time of the discontinuous reception mode.

Clause 36. The storage medium of clause 31, wherein the configuration information is configured to cause the UE to either:
measure all of the portion of the positioning signal in response to all of the positioning signal being scheduled to arrive in the OFF time of the discontinuous reception mode; or
inhibit measuring any of the portion of the positioning signal in response to all of the positioning signal being scheduled to arrive in the OFF time of the discontinuous reception mode.

Clause 37. The storage medium of clause 31, wherein the configuration information is configured to cause the UE to:
transmit a positioning report at least one of semi-persistently or periodically; and
inhibit transmitting of the positioning report based on an uplink report flag in the configuration information.

Clause 38. A user equipment (UE) comprising:
means for operating in a discontinuous reception mode including time interleaved ON times of the discontinuous reception mode, in which the means for operating are in an active mode in which the means for operating monitor for a positioning signal measurement trigger signal, and OFF times of the discontinuous reception mode, in which the means for operating are in an inactive mode;
means for receiving a wake-up signal; and
means for determining whether to measure a positioning signal based on whether the wake-up signal indicates to implement the active mode during a scheduled discontinuous reception mode ON time or to skip the scheduled discontinuous reception mode ON time.

Clause 39. The UE of clause 38, further comprising means for measuring the positioning signal, in response to the wake-up signal indicating to skip the scheduled discontinuous reception mode ON time, without monitoring for the positioning signal measurement trigger signal.

Clause 40. The UE of clause 38, further comprising means for monitoring for the positioning signal measurement trigger signal in response to the wake-up signal indicating to skip the scheduled discontinuous reception mode ON time.

Clause 41. The UE of clause 40, wherein the means for monitoring are for monitoring for the positioning signal measurement trigger signal for a monitor duration that is less than the discontinuous reception mode ON time.

Clause 42. The UE of clause 40, wherein the means for monitoring are for monitoring a control channel for the positioning signal measurement trigger signal over a limited frequency range that is less than a bandwidth of the control channel.

Clause 43. The UE of clause 40, wherein the means for monitoring are for monitoring for the positioning signal measurement trigger signal in further response to the wake-up signal indicating to skip the scheduled discontinuous reception mode ON time and receipt of an instruction from a network entity to monitor for the positioning signal measurement trigger signal.

Clause 44. The UE of clause 43, wherein the instruction is included in the wake-up signal.

Clause 45. The UE of clause 43, wherein the instruction is included in a Radio Resource Control message.

Clause 46. The UE of clause 38, further comprising:
means for measuring the positioning signal in response to the wake-up signal indicating to skip the scheduled discontinuous reception mode ON time; and
means for transmitting an aperiodic positioning information report in response to measurement of the positioning signal, wherein the positioning signal is an aperiodic positioning signal.

Clause 47. The UE of clause 38, further comprising:
means for measuring the positioning signal in response to the wake-up signal indicating to skip the scheduled discontinuous reception mode ON time;
transmitting means for transmitting a positioning report of positioning information based on measuring the positioning signal; or
means for inhibiting the transmitting means, from transmitting the positioning report, in response to receiving a report-inhibiting instruction from a network entity.

Clause 48. The UE of clause 38, further comprising:
means for measuring the positioning signal in response to the wake-up signal indicating to skip the scheduled discontinuous reception mode ON time; and
means for transmitting a positioning report of positioning information based on measuring the positioning signal and in response to at least one of measuring a threshold number of positioning reference signal resources or receiving a report request from a network entity.

Clause 49. The UE of clause 38, further comprising means for inhibiting measurement of the positioning signal in response to the wake-up signal indicating to skip the scheduled discontinuous reception mode ON time.

Clause 50. The UE of clause 38, further comprising means for measuring the positioning signal in response to the wake-up signal indicating to implement the active mode during the scheduled discontinuous reception mode ON time.

Clause 51. A non-transitory, processor-readable storage medium comprising processor-readable instructions configured to cause a processor of a user equipment, in order to process a positioning signal, to:
operate the processor in a discontinuous reception mode including time interleaved ON times of the discontinuous reception mode, in which the processor is in an active mode in which the processor monitors for a positioning signal measurement trigger signal, and OFF times of the discontinuous reception mode, in which the processor is in an inactive mode;
receive a wake-up signal; and
determine whether to measure the positioning signal based on whether the wake-up signal indicates to implement the active mode during a scheduled discontinuous reception mode ON time or to skip the scheduled discontinuous reception mode ON time.

Clause 52. The storage medium of clause 51, further comprising instructions configured to cause the processor to measure the positioning signal, in response to the wake-up signal indicating to skip the scheduled discontinuous reception mode ON time, without monitoring for the positioning signal measurement trigger signal.

Clause 53. The storage medium of clause 51, further comprising instructions configured to cause the processor to monitor for the positioning signal measurement trigger signal in response to the wake-up signal indicating to skip the scheduled discontinuous reception mode ON time.

Clause 54. The storage medium of clause 53, wherein the instructions configured to cause the processor to monitor for the positioning signal measurement trigger signal are configured to cause the processor to monitor for the positioning signal measurement trigger signal for a monitor duration that is less than the discontinuous reception mode ON time.

Clause 55. The storage medium of clause 53, wherein the instructions configured to cause the processor to monitor for the positioning signal measurement trigger signal are configured to cause the processor to monitor a control channel for the positioning signal measurement trigger signal over a limited frequency range that is less than a bandwidth of the control channel.

Clause 56. The storage medium of clause 53, wherein the instructions configured to cause the processor to monitor for the positioning signal measurement trigger signal are configured to cause the processor to monitor for the positioning signal measurement trigger signal in further response to receipt of an instruction from a network entity to monitor for the positioning signal measurement trigger signal.

Clause 57. The storage medium of clause 56, wherein the instruction is included in the wake-up signal.

Clause 58. The storage medium of clause 56, wherein the instruction is included in a Radio Resource Control message.

Clause 59. The storage medium of clause 51, further comprising instructions configured to cause the processor to:
measure the positioning signal in response to the wake-up signal indicating to skip the scheduled discontinuous reception mode ON time; and
transmit an aperiodic positioning information report in response to measurement of the positioning signal, wherein the positioning signal is an aperiodic positioning signal.

Clause 60. The storage medium of clause 51, further comprising:
measure the positioning signal in response to the wake-up signal indicating to skip the scheduled discontinuous reception mode ON time; and
either:
transmit a positioning report of positioning information based on measuring the positioning signal; or
inhibit transmitting of the positioning report in response to receiving a report-inhibiting instruction at the user equipment from a network entity.

Clause 61. The storage medium of clause 51, further comprising instructions configured to cause the processor to:
measure the positioning signal in response to the wake-up signal indicating to skip the scheduled discontinuous reception mode ON time; and
transmit a positioning report of positioning information based on measuring the positioning signal and in response to at least one of measuring a threshold number of positioning reference signal resources or receiving a report request at the user equipment from a network entity.

Clause 62. The storage medium of clause 51, further comprising instructions configured to cause the processor to inhibit measurement of the positioning signal in response to the wake-up signal indicating to skip the scheduled discontinuous reception mode ON time.

Clause 63. The storage medium of clause 1, further comprising instructions configured to cause the processor to measure the positioning signal in response to the wake-up signal indicating to implement the active mode during the scheduled discontinuous reception mode ON time.

Clause 64. A network entity comprising:
a transmitter;
a memory; and
a processor communicatively coupled to the transmitter and the memory, wherein the processor is configured to:
transmit a wake-up indication to a user equipment via the transmitter indicating to the user equipment either to implement an active mode during a scheduled discontinuous reception mode ON time or to skip the scheduled discontinuous reception mode ON time; and
transmit a monitor indication instructing the user equipment to monitor for a positioning signal measurement trigger signal during at least a portion of the scheduled discontinuous reception mode ON time.

Clause 65. The network entity of clause 64, wherein the monitor indication includes a time indication indicating for the user equipment to monitor for the positioning signal measurement trigger signal for a monitor-duration portion of the scheduled discontinuous reception mode ON time that is less than the scheduled discontinuous reception mode ON time.

Clause 66. The network entity of clause 64, wherein the monitor indication includes a frequency indication indicating for the user equipment to monitor a downlink channel for the positioning signal measurement trigger signal during the at least a portion of the scheduled discontinuous reception mode ON time for a monitor-frequency bandwidth that is less than a channel bandwidth of the downlink channel.

Clause 67. The network entity of clause 64, wherein the monitor indication includes an activation instruction for the user equipment to activate aperiodic downlink positioning signal monitoring.

Clause 68. The network entity of clause 64, wherein the processor is configured to transmit the wake-up indication and the monitor indication as separate parts of a wake-up signal that also includes a content field that is separate from the wake-up indication and separate from the monitor indication.

Clause 69. A network entity comprising:
first transmitting means, for transmitting a wake-up indication to a user equipment indicating to the user equipment either to implement an active mode during a scheduled discontinuous reception mode ON time or to skip the scheduled discontinuous reception mode ON time; and
second transmitting means, for transmitting a monitor indication instructing the user equipment to monitor for a positioning signal measurement trigger signal during at least a portion of the scheduled discontinuous reception mode ON time.

Clause 70. The network entity of clause 69, wherein the monitor indication includes a time indication indicating for the user equipment to monitor for the positioning signal measurement trigger signal for a monitor-duration portion of the scheduled discontinuous reception mode ON time that is less than the scheduled discontinuous reception mode ON time.

Clause 71. The network entity of clause 69, wherein the monitor indication includes a frequency indication indicating for the user equipment to monitor a downlink channel for the positioning signal measurement trigger signal during the at least a portion of the scheduled discontinuous reception mode ON time for a monitor-frequency bandwidth that is less than a channel bandwidth of the downlink channel.

Clause 72. The network entity of clause 69, wherein the monitor indication includes an activation instruction for the user equipment to activate aperiodic downlink positioning signal monitoring.

Clause 73. The network entity of clause 69, wherein the first transmitting means and the second transmitting means comprise means for transmitting the wake-up indication and the monitor indication as separate parts of a wake-up signal that also includes a content field that is separate from the wake-up indication and separate from the monitor indication.

Clause 74. A method of transmitting positioning instructions to a user equipment, the method comprising:
transmitting a wake-up indication to the user equipment indicating to the user equipment either to implement an active mode during a scheduled discontinuous reception mode ON time or to skip the scheduled discontinuous reception mode ON time; and
transmitting a monitor indication instructing the user equipment to monitor for a positioning signal measurement trigger signal during at least a portion of the scheduled discontinuous reception mode ON time.

Clause 75. The method of clause 74, wherein the monitor indication includes a time indication indicating for the user equipment to monitor for the positioning signal measurement trigger signal for a monitor-duration portion of the scheduled discontinuous reception mode ON time that is less than the scheduled discontinuous reception mode ON time.

Clause 76. The method of clause 74, wherein the monitor indication includes a frequency indication indicating for the user equipment to monitor a downlink channel for the positioning signal measurement trigger signal during the at least a portion of the scheduled discontinuous reception mode ON time for a monitor-frequency bandwidth that is less than a channel bandwidth of the downlink channel.

Clause 77. The method of clause 74, wherein the monitor indication includes an activation instruction for the user equipment to activate aperiodic downlink positioning signal monitoring.

Clause 78. The method of clause 74, wherein the wake-up indication and the monitor indication are transmitted as separate parts of a wake-up signal that also includes a content field that is separate from the wake-up indication and separate from the monitor indication.

Clause 79. A non-transitory, processor-readable storage medium comprising instructions configured to cause a processor, to transmit positioning instructions to a user equipment, to:
  transmit a wake-up indication to the user equipment indicating to the user equipment either to implement an active mode during a scheduled discontinuous reception mode ON time or to skip the scheduled discontinuous reception mode ON time; and
  transmit a monitor indication instructing the user equipment to monitor for a positioning signal measurement trigger signal during at least a portion of the scheduled discontinuous reception mode ON time.

Clause 80. The storage medium of clause 79, wherein the monitor indication includes a time indication indicating for the user equipment to monitor for the positioning signal measurement trigger signal for a monitor-duration portion of the scheduled discontinuous reception mode ON time that is less than the scheduled discontinuous reception mode ON time.

Clause 81. The storage medium of clause 79, wherein the monitor indication includes a frequency indication indicating for the user equipment to monitor a downlink channel for the positioning signal measurement trigger signal during the at least a portion of the scheduled discontinuous reception mode ON time for a monitor-frequency bandwidth that is less than a channel bandwidth of the downlink channel.

Clause 82. The storage medium of clause 79, wherein the monitor indication includes an activation instruction for the user equipment to activate aperiodic downlink positioning signal monitoring.

Clause 83. The storage medium of clause 79, wherein the instructions configured to cause the processor to transmit the wake-up indication and the monitor indication are configured to cause the processor to transmit the wake-up indication and the monitor indication as separate parts of a wake-up signal that also includes a content field that is separate from the wake-up indication and separate from the monitor indication.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A network entity comprising:
   a transceiver;
   a memory; and
   a processor communicatively coupled to the transceiver and the memory, wherein the processor is configured to transmit configuration information to a user equipment (UE) via the transceiver, the configuration information configured to cause the UE to determine, before arrival at the UE of a positioning reference signal, how much of a portion of the positioning signal to measure based on timing of the portion of the positioning signal relative to at least one of an ON time of a discontinuous reception mode of the UE or an OFF time of the discontinuous reception mode.

2. The network entity of claim 1, wherein the configuration information is configured to cause the UE to at least one of:
   measure all of the portion of the positioning signal in response to a first part of the portion of the positioning signal being scheduled to arrive during the ON time and a second part of the portion of the positioning signal being scheduled to arrive during the OFF time; or
   measure a third part of the portion of the positioning signal in response to the first part of the portion of the positioning signal being scheduled to arrive during the ON time and the second part of the portion of the positioning signal being scheduled to arrive during the OFF time, the third part of the positioning signal being less than the portion of the positioning signal; or
   inhibit measuring any of the portion of the positioning signal in response to the first part of the portion of the positioning signal being scheduled to arrive during the ON time and the second part of the portion of the positioning signal being scheduled to arrive during the OFF time.

3. The network entity of claim 2, wherein the configuration information is configured to cause the UE to measure all of the portion of the positioning signal, or measure the third part of the portion of the positioning signal, or inhibit measuring any of the portion of the positioning signal, in response to the first part of the portion of the positioning signal being scheduled to arrive during the ON time and the second part of the portion of the positioning signal being scheduled to arrive during the OFF time.

4. The network entity of claim 1, wherein the configuration information is configured to cause the UE to:
   measure a third part of the portion of the positioning signal in response to a first part of the portion of the positioning signal being scheduled to arrive during the ON time and a second part of the portion of the positioning signal being scheduled to arrive during the OFF time, the third part of the positioning signal being less than the portion of the positioning signal; and
   determine the third part of the portion of the positioning signal at least one of:
   based on at least one of a resource set, a frequency layer, a number of sources of the portion of the positioning signal, or a repetition factor of the positioning signal; or
   as the first part of the portion of the positioning signal.

5. The network entity of claim 1, wherein the configuration information is configured to cause the UE to measure all of the portion of the positioning signal in response to all of the positioning signal being scheduled to arrive in the ON time of the discontinuous reception mode.

6. The network entity of claim 1, wherein the configuration information is configured to cause the UE to either:
measure all of the portion of the positioning signal in response to all of the positioning signal being scheduled to arrive in the OFF time of the discontinuous reception mode; or
inhibit measuring any of the portion of the positioning signal in response to all of the positioning signal being scheduled to arrive in the OFF time of the discontinuous reception mode.

7. The network entity of claim 1, wherein the configuration information is configured to cause the UE to:
transmit a positioning report at least one of semi-persistently or periodically; and
inhibit transmitting of the positioning report based on an uplink report flag in the configuration information.

8. A network entity comprising:
a transceiver; and
means for transmitting configuration information to a user equipment (UE) via the transceiver, the configuration information configured to cause the UE to determine, before arrival at the UE of a positioning reference signal, how much of a portion of the positioning signal to measure based on timing of the portion of the positioning signal relative to at least one of an ON time of a discontinuous reception mode of the UE or an OFF time of the discontinuous reception mode.

9. The network entity of claim 8, wherein the configuration information is configured to cause the UE to at least one of:
measure all of the portion of the positioning signal in response to a first part of the portion of the positioning signal being scheduled to arrive during the ON time and a second part of the portion of the positioning signal being scheduled to arrive during the OFF time; or
measure a third part of the portion of the positioning signal in response to the first part of the portion of the positioning signal being scheduled to arrive during the ON time and the second part of the portion of the positioning signal being scheduled to arrive during the OFF time, the third part of the positioning signal being less than the portion of the positioning signal; or
inhibit measuring any of the portion of the positioning signal in response to the first part of the portion of the positioning signal being scheduled to arrive during the ON time and the second part of the portion of the positioning signal being scheduled to arrive during the OFF time.

10. The network entity of claim 9, wherein the configuration information is configured to cause the UE to measure all of the portion of the positioning signal, or measure the third part of the portion of the positioning signal, or inhibit measuring any of the portion of the positioning signal, in response to the first part of the portion of the positioning signal being scheduled to arrive during the ON time and the second part of the portion of the positioning signal being scheduled to arrive during the OFF time.

11. The network entity of claim 8, wherein the configuration information is configured to cause the UE to:
measure a third part of the portion of the positioning signal in response to a first part of the portion of the positioning signal being scheduled to arrive during the ON time and a second part of the portion of the positioning signal being scheduled to arrive during the OFF time, the third part of the positioning signal being less than the portion of the positioning signal; and
determine the third part of the portion of the positioning signal at least one of:
based on at least one of a resource set, a frequency layer, a number of sources of the portion of the positioning signal, or a repetition factor of the positioning signal; or
as the first part of the portion of the positioning signal.

12. The network entity of claim 8, wherein the configuration information is configured to cause the UE to measure all of the portion of the positioning signal in response to all of the positioning signal being scheduled to arrive in the ON time of the discontinuous reception mode.

13. The network entity of claim 8, wherein the configuration information is configured to cause the UE to either:
measure all of the portion of the positioning signal in response to all of the positioning signal being scheduled to arrive in the OFF time of the discontinuous reception mode; or
inhibit measuring any of the portion of the positioning signal in response to all of the positioning signal being scheduled to arrive in the OFF time of the discontinuous reception mode.

14. The network entity of claim 8, wherein the configuration information is configured to cause the UE to:
transmit a positioning report at least one of semi-persistently or periodically; and
inhibit transmitting of the positioning report based on an uplink report flag in the configuration information.

15. A method of configuring a user equipment (UE), the method comprising:
transmitting configuration information to the UE, the configuration information configured to cause the UE to determine, before arrival at the UE of a positioning reference signal, how much of a portion of the positioning signal to measure based on timing of the portion of the positioning signal relative to at least one of an ON time of a discontinuous reception mode of the UE or an OFF time of the discontinuous reception mode.

16. The method of claim 15, wherein the configuration information is configured to cause the UE to at least one of:
measure all of the portion of the positioning signal in response to a first part of the portion of the positioning signal being scheduled to arrive during the ON time and a second part of the portion of the positioning signal being scheduled to arrive during the OFF time; or
measure a third part of the portion of the positioning signal in response to the first part of the portion of the positioning signal being scheduled to arrive during the ON time and the second part of the portion of the positioning signal being scheduled to arrive during the OFF time, the third part of the positioning signal being less than the portion of the positioning signal; or
inhibit measuring any of the portion of the positioning signal in response to the first part of the portion of the positioning signal being scheduled to arrive during the ON time and the second part of the portion of the positioning signal being scheduled to arrive during the OFF time.

17. The method of claim 16, wherein the configuration information is configured to cause the UE to measure all of the portion of the positioning signal, or measure the third part of the portion of the positioning signal, or inhibit measuring any of the portion of the positioning signal, in response to the first part of the portion of the positioning signal being scheduled to arrive during the ON time and the second part of the portion of the positioning signal being scheduled to arrive during the OFF time.

18. The method of claim 15, wherein the configuration information is configured to cause the UE to:
measure a third part of the portion of the positioning signal in response to a first part of the portion of the positioning signal being scheduled to arrive during the ON time and a second part of the portion of the positioning signal being scheduled to arrive during the OFF time, the third part of the positioning signal being less than the portion of the positioning signal; and
determine the third part of the portion of the positioning signal at least one of:
based on at least one of a resource set, a frequency layer, a number of sources of the portion of the positioning signal, or a repetition factor of the positioning signal; or
as the first part of the portion of the positioning signal.

19. The method of claim 15, wherein the configuration information is configured to cause the UE to measure all of the portion of the positioning signal in response to all of the positioning signal being scheduled to arrive in the ON time of the discontinuous reception mode.

20. The method of claim 15, wherein the configuration information is configured to cause the UE to either:
measure all of the portion of the positioning signal in response to all of the positioning signal being scheduled to arrive in the OFF time of the discontinuous reception mode; or
inhibit measuring any of the portion of the positioning signal in response to all of the positioning signal being scheduled to arrive in the OFF time of the discontinuous reception mode.

21. The method of claim 15, wherein the configuration information is configured to cause the UE to:
transmit a positioning report at least one of semi-persistently or periodically; and
inhibit transmitting of the positioning report based on an uplink report flag in the configuration information.

22. A non-transitory, processor-readable storage medium comprising processor-readable instructions configured to cause a processor of a network entity to:
transmit configuration information to a user equipment (UE), the configuration information configured to cause the UE to determine, before arrival at the UE of a positioning reference signal, how much of a portion of the positioning signal to measure based on timing of the portion of the positioning signal relative to at least one of an ON time of a discontinuous reception mode of the UE or an OFF time of the discontinuous reception mode.

23. The storage medium of claim 22, wherein the configuration information is configured to cause the UE to at least one of:
measure all of the portion of the positioning signal in response to a first part of the portion of the positioning signal being scheduled to arrive during the ON time and a second part of the portion of the positioning signal being scheduled to arrive during the OFF time; or
measure a third part of the portion of the positioning signal in response to the first part of the portion of the positioning signal being scheduled to arrive during the ON time and the second part of the portion of the positioning signal being scheduled to arrive during the OFF time, the third part of the positioning signal being less than the portion of the positioning signal; or
inhibit measuring any of the portion of the positioning signal in response to the first part of the portion of the positioning signal being scheduled to arrive during the ON time and the second part of the portion of the positioning signal being scheduled to arrive during the OFF time.

24. The storage medium of claim 23, wherein the configuration information is configured to cause the UE to measure all of the portion of the positioning signal, or measure the third part of the portion of the positioning signal, or inhibit measuring any of the portion of the positioning signal, in response to the first part of the portion of the positioning signal being scheduled to arrive during the ON time and the second part of the portion of the positioning signal being scheduled to arrive during the OFF time.

25. The storage medium of claim 22, wherein the configuration information is configured to cause the UE to:
measure a third part of the portion of the positioning signal in response to a first part of the portion of the positioning signal being scheduled to arrive during the ON time and a second part of the portion of the positioning signal being scheduled to arrive during the OFF time, the third part of the positioning signal being less than the portion of the positioning signal; and
determine the third part of the portion of the positioning signal at least one of:
based on at least one of a resource set, a frequency layer, a number of sources of the portion of the positioning signal, or a repetition factor of the positioning signal; or
as the first part of the portion of the positioning signal.

26. The storage medium of claim 22, wherein the configuration information is configured to cause the UE to measure all of the portion of the positioning signal in response to all of the positioning signal being scheduled to arrive in the ON time of the discontinuous reception mode.

27. The storage medium of claim 22, wherein the configuration information is configured to cause the UE to either:
measure all of the portion of the positioning signal in response to all of the positioning signal being scheduled to arrive in the OFF time of the discontinuous reception mode; or
inhibit measuring any of the portion of the positioning signal in response to all of the positioning signal being scheduled to arrive in the OFF time of the discontinuous reception mode.

28. The storage medium of claim 22, wherein the configuration information is configured to cause the UE to:
transmit a positioning report at least one of semi-persistently or periodically; and
inhibit transmitting of the positioning report based on an uplink report flag in the configuration information.

* * * * *